United States Patent
Naritomi et al.

(10) Patent No.: US 9,567,675 B2
(45) Date of Patent: Feb. 14, 2017

(54) METHOD FOR MANUFACTURING A BONDED BODY OF GALVANIZED STEEL SHEET AND ADHEREND

(71) Applicant: TAISEI PLAS CO., LTD., Tokyo (JP)

(72) Inventors: Masanori Naritomi, Tokyo (JP); Naoki Andoh, Tokyo (JP)

(73) Assignee: TAISEI PLAS CO., LTD., Tokyo (JP)

( * ) Notice: Subject to any disclaimer, the term of this patent is extended or adjusted under 35 U.S.C. 154(b) by 0 days.

(21) Appl. No.: 14/149,423

(22) Filed: Jan. 7, 2014

(65) Prior Publication Data

US 2014/0305903 A1 Oct. 16, 2014

Related U.S. Application Data

(62) Division of application No. 12/922,069, filed as application No. PCT/JP2009/055016 on Mar. 16, 2009, now abandoned.

(30) Foreign Application Priority Data

Mar. 17, 2008 (JP) .................................. 2008-067313

(51) Int. Cl.
   *C23C 22/00* (2006.01)
   *B29C 45/14* (2006.01)
   (Continued)

(52) U.S. Cl.
   CPC .................. *C23C 22/00* (2013.01); *B05D 7/51* (2013.01); *B29C 45/14008* (2013.01);
   (Continued)

(58) Field of Classification Search
   None
   See application file for complete search history.

(56) References Cited

U.S. PATENT DOCUMENTS 4,966,634 A * 10/1990 Saeki et al. .................... 148/251
5,890,811 A    4/1999 Bryson
(Continued)

FOREIGN PATENT DOCUMENTS

IN    186219    *  7/2001
JP   5-264045 A   10/1993
(Continued)

OTHER PUBLICATIONS

International Search Report of PCT/JP2009/055016, mailing date Jun. 23, 2009.

*Primary Examiner* — Jiong-Ping Lu
(74) *Attorney, Agent, or Firm* — Westerman, Hattori, Daniels & Adrian, LLP

(57) ABSTRACT

There is provided a technique to strongly integrate a galvanized steel sheet and a resin molded article. A hot-dip galvanized steel sheet is immersed in an aqueous solution for aluminum degreasing to form a specific roughness on the surface. The surface is covered with convex protrusions having a diameter of about 100 nm, and a chromate treatment layer appears in the surface. A resin composition comprising 70 to 97 wt % of polyphenylene sulfide and 3 to 30 wt % of a polyolefin resin is injected onto the surface. The resin composition penetrates into ultra-fine irregularities and is cured in that state, and thereby a composite in which the galvanized steel sheet and the resin molded article are strongly integrated can be obtained. The shear rupture strength of the composite is extremely high.

7 Claims, 24 Drawing Sheets

(51) Int. Cl.
| | | |
|---|---|---|
| B29C 65/00 | (2006.01) | |
| B05D 7/00 | (2006.01) | |
| C23C 22/06 | (2006.01) | |
| C23C 22/07 | (2006.01) | |
| C23C 22/12 | (2006.01) | |
| C23C 22/30 | (2006.01) | |
| C23C 22/33 | (2006.01) | |
| C23C 22/36 | (2006.01) | |
| C23C 22/50 | (2006.01) | |
| C23C 22/53 | (2006.01) | |
| C23C 22/56 | (2006.01) | |
| B29C 65/48 | (2006.01) | |
| B32B 15/08 | (2006.01) | |
| B32B 15/18 | (2006.01) | |
| B32B 27/34 | (2006.01) | |
| B32B 27/36 | (2006.01) | |
| C23C 2/26 | (2006.01) | |
| B32B 37/12 | (2006.01) | |
| B32B 37/18 | (2006.01) | |
| C23F 1/00 | (2006.01) | |
| B29C 65/44 | (2006.01) | |
| B32B 5/14 | (2006.01) | |
| B32B 7/12 | (2006.01) | |
| B32B 15/04 | (2006.01) | |
| B32B 27/20 | (2006.01) | |
| B32B 27/28 | (2006.01) | |
| B32B 27/32 | (2006.01) | |
| B32B 3/26 | (2006.01) | |
| B29C 65/82 | (2006.01) | |
| B29C 45/00 | (2006.01) | |
| B29K 67/00 | (2006.01) | |
| B29K 77/00 | (2006.01) | |
| B29K 81/00 | (2006.01) | |
| B29K 101/12 | (2006.01) | |
| B29K 105/06 | (2006.01) | |
| B29K 305/00 | (2006.01) | |
| B29K 305/12 | (2006.01) | |
| B29K 307/00 | (2006.01) | |
| B29K 705/00 | (2006.01) | |

(52) U.S. Cl.
CPC .. *B29C 45/14311* (2013.01); *B29C 45/14778* (2013.01); *B29C 65/00* (2013.01); *B29C 65/44* (2013.01); *B29C 65/48* (2013.01); *B29C 65/483* (2013.01); *B29C 65/8253* (2013.01); *B29C 66/0042* (2013.01); *B29C 66/026* (2013.01); *B29C 66/0344* (2013.01); *B29C 66/1122* (2013.01); *B29C 66/30325* (2013.01); *B29C 66/43* (2013.01); *B29C 66/71* (2013.01); *B29C 66/721* (2013.01); *B29C 66/7392* (2013.01); *B29C 66/73111* (2013.01); *B29C 66/73115* (2013.01); *B29C 66/73151* (2013.01); *B29C 66/73775* (2013.01); *B29C 66/7483* (2013.01); *B29C 66/74283* (2013.01); *B29C 66/81821* (2013.01); *B29C 66/8248* (2013.01); *B32B 3/26* (2013.01); *B32B 5/147* (2013.01); *B32B 7/12* (2013.01); *B32B 15/043* (2013.01); *B32B 15/08* (2013.01); *B32B 15/18* (2013.01); *B32B 27/20* (2013.01); *B32B 27/286* (2013.01); *B32B 27/32* (2013.01); *B32B 27/34* (2013.01); *B32B 27/36* (2013.01); *B32B 37/12* (2013.01); *B32B 37/182* (2013.01); *C23C 2/26* (2013.01); *C23C 22/06* (2013.01); *C23C 22/07* (2013.01); *C23C 22/12* (2013.01); *C23C 22/30* (2013.01); *C23C 22/33* (2013.01); *C23C 22/362* (2013.01); *C23C 22/365* (2013.01); *C23C 22/50* (2013.01); *C23C 22/53* (2013.01); *C23C 22/56* (2013.01); *C23F 1/00* (2013.01); *B29C 45/0001* (2013.01); *B29C 65/485* (2013.01); *B29C 65/4835* (2013.01); *B29C 66/02245* (2013.01); *B29C 66/7212* (2013.01); *B29C 66/8122* (2013.01); *B29C 66/8322* (2013.01); *B29C 66/964* (2013.01); *B29C 2045/14868* (2013.01); *B29K 2067/006* (2013.01); *B29K 2077/10* (2013.01); *B29K 2081/04* (2013.01); *B29K 2101/12* (2013.01); *B29K 2105/06* (2013.01); *B29K 2305/00* (2013.01); *B29K 2305/12* (2013.01); *B29K 2307/00* (2013.01); *B29K 2705/00* (2013.01); *B29K 2995/0072* (2013.01); *B32B 2037/1269* (2013.01); *B32B 2255/06* (2013.01); *B32B 2255/26* (2013.01); *B32B 2262/101* (2013.01); *B32B 2262/106* (2013.01); *B32B 2270/00* (2013.01); *B32B 2307/536* (2013.01); *B32B 2307/538* (2013.01); *B32B 2307/542* (2013.01); *B32B 2419/00* (2013.01); *Y10T 428/12472* (2015.01)

(56) References Cited

U.S. PATENT DOCUMENTS

| | | | |
|---|---|---|---|
| 6,183,570 B1* | 2/2001 | Kawaguchi et al. | 148/243 |
| 6,733,896 B2* | 5/2004 | Dolan et al. | 428/472 |
| 2004/0101697 A1 | 5/2004 | Chida et al. | |
| 2006/0127684 A1 | 6/2006 | Naritomi et al. | |
| 2006/0257624 A1* | 11/2006 | Naritomi et al. | 428/141 |
| 2009/0280296 A1 | 11/2009 | Naritomi et al. | |

FOREIGN PATENT DOCUMENTS

| | | |
|---|---|---|
| JP | 2001-225352 A | 8/2001 |
| JP | 2004-277876 A | 10/2004 |
| JP | 2008-38188 A | 2/2008 |
| WO | 2007-040245 A1 | 4/2007 |

* cited by examiner

METHOD FOR MANUFACTURING A BONDED BODY OF GALVANIZED STEEL SHEET AND ADHEREND

TECHNICAL FIELD

The present invention relates to a bonded body of an adherend and a galvanized steel sheet having high corrosion resistance and used in, for instance, construction materials, outdoor equipment, construction machinery parts and ordinary machinery parts, and to a method for manufacturing the bonded body. More particularly, the present invention relates to a composite in which a galvanized steel sheet and a resin composition are integrated through injection of the resin composition into the galvanized steel sheet, to a bonded body in which a galvanized steel sheet and a metal alloy are bonded together by way of an adhesive, to a composite in which a galvanized steel sheet and a resin molded article are bonded by way of an adhesive, to a composite in which a galvanized steel sheet and a fiber-reinforced plastic (hereafter "FRP") are bonded by way of an adhesive, and to a method for manufacturing each of the foregoing.

BACKGROUND ART

Technologies for integrating metal alloys with resins are required in manufacturing industries of a wide variety of parts and members, for instance in aerospace, automobiles, domestic appliances, industrial machinery and the like. Numerous adhesives have been developed to meet these requirements. Various excellent adhesives are known among these adhesives. For instance, adhesives that bring out their functionality at normal temperature, or upon heating, are used to integrally bond a metal alloy and a synthetic resin. This method constitutes a standard bonding technique used at present.

Other bonding methods that do not rely on adhesives have also been studied. Examples of such technologies include, for instance, methods for integrating aluminum alloys with high-strength thermoplastic engineering resins, without any intervening adhesive, for instance through injection of the resin. The present inventors, for example, have proposed a method that involves bonding simultaneously with resin molding, by injection or the like (hereafter, "injection bonding"), wherein a thermoplastic resin such as a polybutylene terephthalate resin (hereafter, "PBT") or a polyphenylene sulfide resin (hereafter, "PPS") is injected and bonded with an aluminum alloy (for instance, Patent documents 1 and 2). A bonding technology has also been disclosed (for instance, see Patent document 3) in which holes are provided in the anodized skin formed on the surface of an aluminum material, and a part of molded body of a synthetic resin is forced into the holes, to be bonded thereby to the aluminum material.

The principles of the injection bonding disclosed in Patent documents 1 and 2 are as follows. An aluminum alloy is immersed in a dilute aqueous solution of a water-soluble amine compound, whereupon the aluminum alloy is finely etched by the weak basicity in the aqueous solution. The above immersion results in the formation of ultra-fine irregularities on the aluminum alloy surface, and at the same time, in adsorption of amine compound molecules onto the surface of the aluminum alloy. The aluminum alloy thus treated is inserted into an injection mold, into which a molten thermoplastic resin is then injected at high pressure.

The encounter between the thermoplastic resin and molecules of the amine compound adsorbed to the aluminum alloy surface gives rise to a chemical reaction. This chemical reaction suppresses the physical reaction whereby the thermoplastic resin cools down quickly, crystallizes and solidify when coming into contact with the aluminum alloy that is held at a low mold temperature. Crystallization and solidification of the resin are delayed thereby, and the resin infiltrates into the ultra-fine irregularities on the surface of the aluminum alloy. As a result, the thermoplastic resin does not peel readily off the aluminum alloy surface even when acted upon by an external force. The aluminum alloy and the resin molded article become strongly integrated as a result. In other words, the chemical reaction and the physical reaction exhibit a competing reaction relationship to each other. In this case, the chemical reaction takes precedence, and the result is a strong injection bonding. In practice it is found that PBT and PPS, which can react chemically with amine compounds, are capable of undergoing injection bonding with aluminum alloys. The above injection bonding mechanism has been termed "NMT (acronym of nano-molding technology)" by the inventors.

Patent document 1: WO 03/064150 A1 (aluminum alloy)
Patent document 2: WO 2004/041532 A1 (aluminum alloy)
Patent document 3: WO 2004/055248 A1 (anodized skin)
Patent document 4: Japanese Patent Application Laid-open NO. 2001-225352

Galvanized steel sheets (ordinarily referred to as zinc-plated steel sheets) are used as a construction material that can be used for 10 years or longer without maintenance. The types ordinarily used at present include precoated steel sheets (also referred to as color steel sheets or color iron sheets) in which one, two or three coats are baked onto a galvanized steel sheet. These sheets exhibit good post-workability and corrosion resistance. The range of applications of galvanized steel sheets, as a construction material, could be expanded if the galvanized steel sheets could be strongly integrated with an adherend such as a resin molded article, FRP, metal alloys and the like. For instance, the steel sheet portion of a composite wherein a galvanized steel sheet and a resin molded article or FRP are strongly integrated with each other could be connected to other construction materials by way bolting, welding or the like. An entire composite obtained from a resin molded article or FRP can take on numerous shapes. The weight of the composite as a whole, moreover, can be reduced by increasing the volume ratio of the resin molded article or FRP. Such a composite is thus extremely useful as a construction material. Meanwhile, strong bonding between a galvanized steel sheet and a metal alloy by way of an adhesive, without relying on bolting or welding, would contribute to reducing costs on account of the fewer parts and fewer processes that would be involved.

However, the above-described strong integration between an aluminum alloy and resin molded articles is achieved through adsorption of amine compounds onto the aluminum alloy surface. Therefore, it is unclear whether galvanized steel sheets can be injection-bonded in the same way as in the case of aluminum alloys, inasmuch as galvanized steel sheets have different surface environments, and are subjected to different immersion treatments, vis-à-vis aluminum alloys. No techniques have been proposed for strongly joining galvanized steel sheets and resin molded articles by way of adhesives or through press-fusion bonding. Likewise, no techniques have been proposed for strongly bonding galvanized steel sheets and metal alloys or FRP by way of adhesives.

DISCLOSURE OF THE INVENTION

In the light of this technical background, it is an object of the present invention to provide a technique for strongly integrating a galvanized steel sheet and an adherend. Specifically, it is an object of the present invention to strongly integrate a galvanized steel sheet and a resin molded article through injection bonding of a galvanized steel sheet and a thermoplastic resin composition. It is another object of the present invention to integrate a galvanized steel sheet and a molded article of a thermoplastic resin composition through press-fusion bonding of the foregoing. Yet another object of the present invention is to afford strong bonding between a galvanized steel sheet and a metal alloy or FRP by way of an adhesive.

New NMT

The inventors identified conditions under which injection bonding is possible without chemical adsorption of amine compounds onto the surface of a metal alloy, i.e. without resorting to the aid from a special exothermic reaction or from any chemical reaction. Specifically, the inventors identified conditions that enable strong bonding, by injection bonding, between thermoplastic resins and metal alloys other than aluminum alloys. The injection bonding mechanism based on the above conditions was termed "new NMT (acronym of nano-molding technology)" by the inventors.

These inventions, all of which stem from the same inventors, rely on bonding principles that derive from a comparatively simple bonding theory. The inventors have called "NMT" (acronym of Nano-molding technology) the bonding theory relating to aluminum alloys, and "new NMT" the theory relating to injection bonding of all metal alloys. The theoretical hypothesis "new NMT", which has a wider scope, posits the following. Both the metal alloy and the resin must meet several conditions in order to achieve injection bonding with powerful bonding strength. In the first place, the metal alloy must meet three conditions, as follows.

Conditions Applying to the Metal Alloy Under New NMT

In the first condition, the chemically etched metal alloy has a rough surface having a texture of a period of 1 to 10 μm and a profile height difference of about half the period, i.e. 0.5 to 5 μm. Causing such rough surface to accurately cover the entire surface is difficult to achieve in practice owing to the variability inherent to changeable chemical reactions. In concrete terms, the above-mentioned roughness conditions are found to be essentially met when the rough surface exhibits a texture of irregular period from 0.2 to 20 μm, and a roughness curve having a maximum height difference ranging from 0.2 to 5 μm, as observed using a profilometer, or exhibits an average period, i.e. peak-valley average spacing (RSm) of 0.8 to 10 μm and a maximum height roughness (Rz) of 0.2 to 5 μm, according to JIS Standards (JIS B 0601:2001), based on scanning analysis using the latest dynamic-mode scanning probe microscopes. For the inventors, the ideal period of the irregular shapes of the ideal rough surface ranges substantially from 1 to 10 μm, as described above. This range constitutes a "surface of micron-scale roughness" in an easily understandable definition.

The second condition prescribes that the metal alloy surface having the above micron-scale roughness should further have ultra-fine irregularities of 5 nm or higher. In other words, the metal surface must exhibit a rough surface as evidenced under the microscope. To satisfy the above condition, the metal alloy surface must be subjected to fine etching, an oxidation treatment, a conversion treatment or the like, to form ultra-fine irregularities, having a period of 5 to 500 nm, preferably from 10 to 300 nm, and more preferably from 30 to 100 nm, on the inner wall faces of the recesses that constitute the above-described micron-scale roughness.

Penetration by the resin fraction becomes clearly difficult when the period of the ultra-fine irregularities is 10 nm or less. In such cases, the profile height difference becomes usually smaller as well, so that a smooth surface can be viewed from the resin side. The spike function is lost as a result. When the period is about 300 to 500 nm, or larger than that (in which case the diameter and/or period of the recesses that make up the micron-scale roughness is estimated to be about 10 μm), the number of spikes in the micron-scale recesses drops dramatically, and the effect of the spikes is not readily brought out. Therefore, the period of the ultra-fine irregularities must in principle lie within 10 to 300 nm. Depending on the shape of the ultra-fine irregularities, however, the resin may penetrate into the ultra-fine irregularities even when these have a period of 5 nm to 10 nm. A case in point is, for instance, a tangle of rod-like crystals having diameters from 5 to 10 nm. In some cases, the shape of the ultra-fine irregularities elicits readily an anchor effect even for a period of 300 nm to 500 nm. Another case in point is, for instance, a morphology similar to a perlite structure comprising an endless succession of steps having a height and length of several hundred nm to 500 nm, and a width of several hundred nm to several thousand nm. The required period of the ultra-fine irregularities is thus set to 5 nm to 500 nm, to account for cases such as the above.

Conventionally, the first condition prescribed an RSm range of 1 to 10 μm and an Rz range of 0.5 to 5 μm. However, high bonding strength can be preserved if the texture period of the ultra-fine irregularities lies within a particularly preferred range (about 30 to 100 nm), even if RSm ranges from 0.8 to 1 μm and Rz ranges from 0.2 to 0.5 μm. Therefore, the RSm range was somewhat expanded to encompass lower values. Specifically, RSm was set to 0.8 to 10 μm and Rz to 0.2 to 5 μm.

According to the third condition, the surface layer of the metal alloy is a ceramic substance. Specifically, the surface layer of a metal alloy having intrinsically corrosion resistance should have a metal oxide layer of a thickness equal to or greater than the thickness of the native oxide layer. In metal alloys having comparatively low corrosion resistance (for instance, magnesium alloys or ordinary steel materials), the surface layer is subjected to a conversion treatment to form a thin layer of a metal oxide or a metal phosphate, to satisfy the third condition.

The above features are schematically illustrated in FIG. 12. Recesses (C) that constitute the micron-scale roughness are formed on the surface of a metal alloy 70. Further, ultra-fine irregularities (A) are formed in the inner walls of the recesses. The surface layer is a ceramic substance layer 71. Part of the cured adhesive layer 72 penetrates into the ultra-fine irregularities. In a simple approximation, the liquid resin composition infiltrates into the metal alloy surface, and is cured after doing so, whereupon the metal alloy and the cured resin composition become bonded to each other very strongly.

Resin Conditions According to New NMT

The conditions that apply to the resin are explained next. As the resin there can be used a hard, highly-crystalline thermoplastic resin, having a slow crystallization rate upon rapid cooling, for instance through compounding with other polymers that are appropriate for the resin. In practice there can be used a resin composition wherein a crystalline hard resin such as PBT or PPS is compounded with, for instance, appropriate other polymers and glass fibers.

Injection Bonding According to New NMT

Injection bonding can take place using an ordinary injection molding machine and an injection mold, and employing the above-described metal alloy and resin. This process is described according to the above "new NMT". The injected molten resin is led into a mold at a temperature lower than the melting point by about 150° C. The molten resin is found to cool within flow channels down to a temperature even at or below the melting point. That is, no immediate change to solid occurs in zero time, through crystallization when the molten crystalline resin is cooled rapidly, even at or below the melting point of the molten resin. In effect, the molten resin persists in a molten, supercooled state for a very short time also at or below the melting point. The duration of this supercooling appears to have been successfully prolonged somewhat in PBT and PPS through special compounding, as described above. This feature can be exploited to allow micro-crystals to penetrate into the recesses of the metal surface having micron-scale roughness before the abrupt rise in viscosity that is brought about by generation of large amounts of such micro-crystals. Cooling is continued after infiltration. As a result, the number of micro-crystals increases dramatically, causing viscosity to rise abruptly. Whether the resin can penetrate or not all the way into the recesses is determined by the size and shape of the recesses.

Results of experiments by the inventors indicate that, irrespective of the type of metal, the micro-crystals can penetrate all the way into recesses having a diameter of 1 to 10 μm, according to the above micron-scale roughness, and having a depth that is about half the period. When the inner wall faces of the recesses have a rough surface as evidenced in microscopic observations, as per the second condition above, the resin penetrates partly also into the crevices of these fine irregularities. As a result, the resin catches onto the irregularities and is difficult to pull away when a pulling force acts from the resin side. Such a rough surface exhibits high hardness and affords an effective spike-like catching between the resin and the recesses in the ultra-fine irregularities, when the surface is covered with a metal oxide or metal phosphate as per the third condition.

Specific examples of the above follow next. In the case of magnesium alloys, for instance, the corrosion resistance of a magnesium alloy covered with an unmodified native oxide layer is low. Therefore, the magnesium alloy is subjected to a conversion treatment to form a surface layer of a metal oxide, a metal carbonate or a metal phosphate, and allow thereby the surface to be covered by a high-hardness ceramic substance. When a magnesium alloy having undergone such a surface treatment is injected into an injection mold, the mold and the inserted magnesium alloy are kept at a temperature lower than the melting point of the injected resin by 100° C. or more. As a result, the injected resin cools rapidly upon entering passages inside the mold, so that there is a high likelihood that the resin is at or below the melting point by the time it comes near the magnesium alloy.

When the diameter of the recesses of the magnesium alloy surface is comparatively large, of about 1 to 10 μm, the resin can infiltrate within a time window that is limited by the generation of micro-crystals by supercooling. The resin can penetrate into the above recesses also if the number density of the formed polymer micro-crystal clusters is still small, since estimates from molecular models suggest that the size of these micro-crystals, i.e. micro-crystals of the shape they had at the time where some ordered state in molecular chains arises from a disordered motion of the molecular chains, is of several nm to 10 nm. Therefore, although micro-crystals are not found to be able to get easily into ultra-fine irregularities having a diameter of 10 nm, the front of the resin stream can nevertheless penetrate somewhat into ultra-fine irregularities having a period of several tens of nm. Micro-crystals form simultaneously in large numbers, though, and hence viscosity of the resin flow rises abruptly at the leading front of the injected resin and at sites of contact with the mold metal surface. When observed under electron microscopy, the surface of the magnesium alloy exhibits an ultra-fine irregular surface having a period of 10 to 50 nm. The front of the resin flow can enter into ultra-fine irregularities having approximately such a period, before the abrupt rise in viscosity.

Fairly strong bonding strength has been achieved when a PPS resin (or PPS resin compound obtained through lowering of the crystallization rate of PPS molecules upon rapid cooling) is injection-bonded onto the surface of a metal alloy such as a copper alloy, a titanium alloy or a steel material that has been oxidized or subjected to a conversion treatment, and the surface layer exhibits as a result micro-crystal clusters or an amorphous layer of a metal oxide or the like.

Although bonding per se is determined by the resin component and the metal alloy surface, adding reinforcing fibers or an inorganic filler to the resin composition allows bringing the coefficient of linear expansion of the resin as a whole closer to that of the metal alloy. This allows preserving easily bonding strength after bonding. Composites obtained through injection bonding of a PBT or PPS resin with a magnesium alloy, copper alloy, titanium alloy, steel material or the like, in accordance with the above hypothesis by the inventors, are strong integrated products, having a shear rupture strength of 20 to 30 MPa (about 200 to 300 kgF/cm$^2$) or more and a tensile rupture strength of 30 to 40 MPa (about 300 to 400 kgF/cm$^2$) or more.

Herein, the magnitude of the viscosity of the liquid resin in the environment of the latter (pressure, temperature) is a factor that determines the extent to which the resin can penetrate into the crevices of the ultra-fine irregularities. In this context, the "new NMT" theory can be applied to instances of adhesion using one-liquid thermosetting adhesive, where it is possible to achieve strong adhesive strength. However, whether or not the anticipated effect is elicited thereby depends significantly on the liquid viscosity prior to curing.

Other technologies involve inserting a metal part into the mold of an injection molding machine, where the part is integrated with a thermoplastic resin material that is injected into the mold (for instance, see Patent document 4). The technology set forth in Patent document 4 is not a technology relating to "injection bonding" of the present invention, but an injection molding technology that exploits the relationship between the molding shrinkage of a resin and the coefficient of linear expansion of a metal. As disclosed in the above Patent document, a molded article comprising a metallic rod-like material having a resin portion running through the former is obtained through injection molding of a thermoplastic resin around the metallic rod-like material. The molded article is removed then from the mold and is cooled, whereupon the metal-made rod part becomes gripped by the resin molded article. The coefficient of linear expansion of the metal ranges at most from 1.7 to $2.5 \times 10^{-5}$° C.$^{-1}$ for aluminum alloys, magnesium alloys and copper alloys, and thus the degree of shrinkage of the metal upon demolding and cooling down to room temperature does not exceed the coefficient of linear expansion times about 100° C., i.e. a shrinkage of 0.2 to 0.3%. By contrast, the mold shrinkage of the resin is of about 1% for PPS and 0.5% for PPS containing glass fibers. Even in the case of a resin containing a filler, the shrinkage of the resin portion after injection molding is necessarily far greater than that of the metal part. Therefore, injection molding of a shaped article using a metal part in the middle, as an insert, such that the metal part runs through the resin portion, has the effect of tightening the whole on account of the molding shrinkage of the resin portion. As a result there can be manufactured an integrated product from which the metal part is difficult to pull out.

Several methods are known in which an integrated product of a metal and a resin are manufactured by taking advantage of such gripping. Knobs on fuel oil stoves, for example, are manufactured in accordance with such a method, which involves inserting a thick iron needle, having a diameter of about 2 mm, into an injection mold, and injection of a heat-resistant resin or the like into the mold. In this method, jagged bumps (resulting from knurling) are formed on the needle, so that the resin does not move. Patent document 4 is characterized in that surface morphology is smoothed, and irregularities made finer, by changing the texturing process from a physical process to a chemical process, and in that the grip effect is improved by using a resin that is both hard and crystalline. Patent document 4 is found to elicit a significant improving effect as regards air-tightness, in that leakage of generated gas along the metal rods is significantly curbed. However, virtually no improving effect on adherence can be appreciated (paragraph 0010). Such being the case, new NMT affords the distinctive advantage of adherence, i.e. of allowing strong bonding between a metal alloy and a resin, vis-à-vis Patent document 4.

Specifically, new NMT requires no gripping by the resin at all. A powerful force is needed to split a composite of a metal alloy and a resin molded article obtained on the basis of new NMT. Another major characterizing feature of the present invention is the use of a high-hardness crystalline resin composition that crystallizes and solidifies over a long supercooling time during rapid cooling. Indeed, maintaining the bonded state between metal alloy and thermoplastic resin stably over long periods of time requires that the numerical values of the coefficient of linear expansion of the metal alloy and of the thermoplastic resin should be similar. The coefficient of linear expansion of the thermoplastic resin composition can be lowered significantly by incorporating into the resin a substantial amount of a filler, i.e. reinforcing fibers such as glass fibers or carbon fibers.

NAT (Adhesive Bonding)

Specifically, the inventors speculated that the "new NMT" theoretical hypothesis can be applied also to adhesive bonding, and checked whether high-strength joining can be achieved based on a similar theory. That is, the inventors set out to ascertain whether bonded bodies having higher adhesive strength can be obtained by exploiting the surface structure of the metal alloy and by using commercially available general-purpose one-liquid epoxy adhesives.

The procedure in an experimental method for bonding using adhesives is as follows. On the basis of "new NMT" there is firstly prepared a metal alloy (metal alloy satisfying the above three conditions) having a surface identical to the surface in the above-described injection bonding experiments. A liquid one-liquid epoxy adhesive is coated onto the surface of the metal alloy. The metal alloy is placed once under vacuum, after which the pressure is reverted to normal pressure. As a result, the adhesive penetrates into the ultra-fine irregularities on the surface of the metal alloy. In other words, the adhesive impregnates thoroughly the metal alloy surface. An adherend is affixed then onto the predetermined area, and the adhesive is cured through heating.

Herein, the epoxy adhesive can penetrate into the recesses of the micron-scale roughness (recesses of the irregularities according to the first condition) on the surface of the metal alloy by virtue of being in the form of a liquid, although somewhat viscous. The epoxy adhesive that has penetrated into the recesses is then cured within the recesses by heating. Actually, the inner wall surface of the recesses is a surface having ultra-fine irregularities (second condition above), and these ultra-fine irregularities are covered by a high-hardness thin film of a ceramic substance (third condition above). Therefore, the epoxy resin, which solidifies in the recesses into which it has penetrated, is caught by the spiky ultra-fine irregularities, and becomes hard to pull out.

The inventors have shown that "new NMT" affords high-strength joining between metal alloys, and between a metal alloy and CFRP (acronym of carbon fiber-reinforced plastic), using one-liquid epoxy adhesives. As an example, A7075 aluminum alloys bonded to each other by way of a commercially-available one-liquid epoxy adhesive yield bonded bodies that exhibit substantial shear rupture strength, up to 70 MPa, and tensile rupture strength.

The inventors found such high-strength adhesive bonding first in aluminum alloys, and then in magnesium alloys, copper alloys, titanium alloy, stainless steel, and ordinary steel materials. By controlling the surface morphology of the adherend in the form of a metal alloy, the inventors achieved unprecedented strong joining in all the above metal alloys. The above instances of adhesive bonding relying on "new NMT" have been generically termed "NAT (acronym of nano-adhesion technology)" by the inventors.

"New NMT" can also be used in bonding technologies different from injection bonding. Specifically, a resin molded article is manufactured firstly by injection molding or the like using a starting material in the form of a resin composition having a high-hardness crystalline resin as a main component. In parallel, a metal alloy piece that satisfies the above first condition to third condition according to "new NMT" is prepared and is heated in a hot plate or the like. The heated metal alloy piece is pushed against the resin molded article. If the temperature of the metal alloy piece is higher than the melting point of the resin composition, the latter melts at the contact surface. The whole is left to stand in that state, and the temperature at the contact surface between the metal alloy and the resin molded article drops below the melting point of the resin over a few seconds to ten or more seconds. Thereupon, part of the molten resin penetrates into the ultra-fine irregularities on the surface of the metal alloy, and crystallizes and solidifies thereafter.

Using such a method does away with the need of slowing down the crystallization and solidification rate, upon rapid cooling, through special compounding or the like, and thus the conditions required from the resin composition are less strict. The pressure during infiltration, unlike that in injection bonding, is extremely low, of about 1 atmosphere, even upon evacuation during melting and subsequent return to normal pressure. This cannot be regarded as the optimal condition for eliciting bonding strength, but a practicable bonding strength is achieved nevertheless. The above constitutes a method for press-fusion bonding a molded article using a highly crystalline thermoplastic resin.

The inventors performed a surface treatment, in accordance with "new NMT", on cold rolled steel materials and hot rolled steel materials, which are the most common steel materials for structures, followed by injection bonding of a thermoplastic resin composition to the above steels. Also, the inventors performed a surface treatment, in accordance with "new NMT", on cold rolled steel materials and hot rolled steel materials, followed by joining and bonding to CFRP. The composites thus obtained exhibited unprecedented high bonding strength.

Galvanized steel sheets are widely used as an outdoor steel material for buildings in the field of construction materials, thanks to their high versatility. In particular, there is a strong demand for composite articles in which galvanized steel sheets and resin molded articles are strongly bonded to each other. Such being the case, the inventors have conducted research and development on whether galvanized steel sheets as well can be injection-bonded on the basis of "new NMT" using PBT or PPS resins. The inventors have also studied whether galvanized steel sheets and resin molded articles, galvanized steel sheets and CFRPs, and galvanized sheets and metal alloys can be strongly joined and bonded on the basis of "NAT". Results have shown that a composite can be obtained wherein a galvanized steel sheet and a resin molded article are strongly integrated, by injection bonding, by performing a surface treatment (to form a surface that satisfies the above-described first condition to third condition) on a galvanized steel sheet, in accordance with "new NMT", and by injecting a thermoplastic resin composition onto the galvanized steel sheet. Results have also shown that galvanized steel sheets and resin molded articles, galvanized steel sheets and CFRPs, galvanized steel sheets and GRRPs, and galvanized steel sheets and metal alloys can be strongly joined and bonded on the basis of "NAT". Press-fusion bonding between galvanized steel sheets and resin molded articles proved also possible.

The means used in the present invention are explained in further detail below.

1. Galvanized Steel Sheet

The galvanized steel sheet of the present invention includes hot-dip galvanized steel sheets, alloyed hot-dip galvanized steel sheets, electro-galvanized steel sheets, electro-galvanized steel materials such as hot-dip zinc-aluminum alloy coated steel sheets (for instance, galvalume steel sheets in the form of hot-dip Zn-55% Al alloy plated steel sheets, or hot-dip Zn-11% Al-3% Mg alloy plated steel sheets or the like). Most commercially-supplied galvanized steel sheets are subjected to various conversion treatments and post-treatments. Specifically, the above material groups are excellent corrosion resistance steel materials having an internal protective effect elicited mainly through oxidation of surface zinc or on account of a carbonate coating. Even in case of breakage, zinc itself affords a sacrificial corrosion effect whereby corrosion of the core steel material is slowed down. The above material groups, however, are seldom used without further modification, and are often subjected to a conversion treatment, for instance a chromate treatment or a non-chromate treatment, or are coated with an organic-matter coating that contains chromium compounds, so that the galvanized layer itself is protected. Galvanized steel sheets thus subjected to a conversion treatment are often oiled, to yield thereby a steel material having secured lubricity at the time of press working. Large material manufacturers supply various surface-treated products depending on the application and on the needs of secondary-processing users. Also, coating is often carried out by the galvanized steel sheet manufacturer itself, to manufacture and market products in the form of precoated steel sheets called color steel sheets or color galvanized steel sheets.

The present invention applies to all the above galvanized steel sheets. Specifically, the present invention applies to all galvanized steel sheets of the above-described basic materials (galvanized steel sheets prior to a conversion treatment), to conversion-treated galvanized steel sheets, and to oiled galvanized steel sheets of the foregoing. When using a precoated steel sheet or a galvanized steel sheet coated with a coating that contains chromium compounds, the coating film must be stripped in some way. The material after stripping constitutes the material of the present invention.

In the below-described examples there was used an oiled and conversion-treated hot-dip galvanized steel sheet "Z18 (by Nippon Steel & Sumikin Metal Products)" according to JIS G3302, which is arguably the most commonly used galvanized steel sheet excluding precoated steel sheets. The amount of plating of "Z18", according to JIS, is 120 g/m$^2$. Most commercially available products range from "Z12" (plating amount 90 g/m$^2$) to "Z27" (plating amount 190 g/m$^2$). "Z18", having an average plating amount, has a large market volume of the above steels. Ordinarily, non-oiled steel materials are used in applications that involve no press forming, or in press forming applications where the degree of drawing is low. Other applications include AV products, as well as electric articles such as copiers, printers and the like, where oil is best avoided. Oiled products, having an unbroken plating layer and lubricity during pressing, are used in most applications. Zinc plated layers are comparatively pliable as a metal, and thus are not vulnerable to drawing. Therefore, the coating is not adversely affected, since even in the case of oiled products, the amount of oil coating is very small, and even in the case of a decorating process through painting, as a final process, the oil material on the surface is dissolved by the paint solvent. The present invention affords a surface treatment that conforms to "new NMT" and "NAT" simply through chemical treatment of all commercially-available galvanized steel sheets, whether oiled or not, or whether a conversion treatment layer is present or not underneath the oil coating layer.

2. Surface Treatment/Overview

Ordinarily, four fundamental steps, namely a. degreasing, b. chemical etching, c. fine etching and d. surface hardening are performed to obtain metal alloys in accordance with the "new NMT" or the "NAT" theories, i.e. to achieve a surface that satisfies the above-described conditions (1) to (3). From among the four steps above, in some instances "a. degreasing" may be omitted, "b. chemical etching" may double as "c. fine etching", or "b. chemical etching" may double as "c. fine etching" and "d. surface hardening", depending on the type of metal alloy used. In other cases, a conversion treatment performed as "d. surface hardening" may double as "b. chemical etching" and "c. fine etching". In all cases, the basic approach of the inventors in the chemical treatment methods that were practiced involved performing the specific process "a" to "d" with the intended purpose in mind, evaluating the obtained results, and omitting a relevant process when it was found that the process could be effectively omitted.

In practice, there are four types of galvanized steel sheets commercially available in Japan, namely hot-dip galvanized steel sheets, electro-galvanized steel sheets, zinc-55% aluminum alloy plated steel sheets (galvalume steel sheets), and zinc-11% aluminum-3% magnesium alloy plated steel sheets. From among these, a detailed explanation follows first on a surface treatment method of oiled chromate-treated hot-dip galvanized steel sheets, which as described above are the kind of galvanized steel sheet most used by secondary processing manufacturers.

The above steel sheets were immersed for a somewhat long time in an aqueous solution of the degreasing agent at a particularly high temperature. Thereafter, the sheets were rinsed with water and dried, to thereby eliminate the surface layer, in the form of an oil layer or a grease layer, that was originally observable by electron microscopy. As a result there appeared a surface layer made up of a new ultra-fine irregular surface. XPS analysis revealed the presence of chromium in this new surface layer. This indicated that the surface layer derived from the chromate treatment. Specifically, the surface is covered by a thin layer of a hard phase. With the oily layer is removed, the surface of the hot-dip galvanized steel sheet exhibits micron-scale roughness having a peak-valley average spacing (RSm) of 0.8 to 10 μm and a maximum height roughness (Rz) of 0.2 to 5 μm. Therefore, strong integration with an adherend can be achieved in that state, without further modification, through injection bonding or adhesive bonding. In the shortest treatment performed by the inventors, "a. degreasing" doubled as the other "b. chemical etching", "c. fine etching" and "d. surface hardening".

This case corresponds obviously to an instance where the conversion treatment (herein chromate treatment) performed by the material manufacturer on the hot-dip galvanized steel sheets was appropriate for the purposes of the present invention. In this case as well, the roughness level of the original hot-dip galvanized layer falls accidentally within the range mandated by the present invention. The degreasing agent used by the inventors in the "a. degreasing" treatment has the effect of dissolving and removing the oil but without negatively affecting the chromate layer. In such a degreasing step there can be used a degreasing agent in the form of commercially-available industrial degreasing agents for steel materials or aluminum, but degreasing agents for aluminum are particularly preferred. As regards the way in which the degreasing agent is used, the aqueous solution of the degreasing agent has preferably a high liquid temperature, specifically 70° C. or higher, in terms of removing strongly adhered greasy oil and/or special organic polymer materials for lubrication. The immersion time is preferably 5 minutes or longer, for instance of about 5 to 10 minutes. The inventors essayed various liquid temperatures and immersion times through trial-and-error, and observed the state of the surface of the galvanized steel sheets after degreasing, to establish the above conditions. The immersion time can be shortened by performing degreasing under application of ultrasounds from an ultrasound probe provided in the degreasing bath.

The degreasing treatment presents no particular difficulties, regardless of the conversion treatment carried out by the manufacturer of the steel sheet. When the above degreasing alone does not yield a surface that conforms to "new NMT" or "NAT", degreasing is followed by immersion in an acidic aqueous solution, for instance a dilute aqueous solution of sulfuric acid. The conversion treatment layer is stripped as a result, whereupon chemical etching of the galvanized layer can proceed. Micron-scale roughness can be obtained therefore by adjusting the etching level during chemical etching. The ultra-fine irregular surface can be formed next through a light chromate treatment, a zinc phosphate conversion treatment or a zinc calcium phosphate conversion treatment. Specifically, "b. chemical etching" and "d. surface hardening" follow "a. degreasing". In this case, "d. surface hardening" is the conversion treatment itself but doubles also as "c. fine etching".

A series of experiments based on the above approach showed that further steps could be omitted, and that the conversion treatment in the form of the "d. surface hardening" step can double as "b. chemical etching". Specifically, the treatment solutions for all the conversion treatments, namely the chromate conversion treatment, the zinc phosphate conversion treatment, and the zinc calcium phosphate conversion treatment, are acidic aqueous solutions having a pH ranging from 1 to 3. The treatment solutions that are adopted from among the foregoing are those that, after a degreasing step and subsequent immersion of the chromate-treated galvanized steel sheet, release hydrogen and elicit observable corrosion over the entire surface. Therefore, it was judged that the above process can double also as "b. chemical etching" by adjusting immersion conditions and so forth. In fact, judicious selection of the conditions allow completing all the processes by performing simply the "a. degreasing" and "d. surface hardening" treatments.

In zinc-aluminum alloy coated steel sheets, however, the above abbreviated treatments often fail to yield the surface anticipated by "new NMT" and "NAT". In such cases, the "b. chemical etching" step includes preferably an additional step of etching the zinc aluminum alloy phase through immersion in an acidic aqueous solution having a pH from 1 to 3, specifically a dilute aqueous solution of an acid whose waste can be disposed of easily and inexpensively, for instance sulfuric acid or hydrochloric acid. Specifically, galvalume steel sheets require the steps of "a. degreasing", "b. chemical etching" and "d. surface hardening". In galvalume steel sheets as well, "d. surface hardening" is a so-called conversion treatment. This conversion treatment gives rise to an ultra-fine irregular surface, and hence "c. fine etching" can be omitted.

A specific conversion treatment method as the "d. surface hardening" step is explained below. Although it has been indicated that a chromate treatment, a zinc phosphate treatment or a zinc calcium phosphate treatment can be used, the required end result mandates that the zinc phase should be covered with a thin film of a ceramic substance and should have an ultra-fine irregular surface, and that there must be sufficiently strong bonding strength between the thin film layer and the zinc phase. The inventors found that as such a conversion treatment there can be used at least a chromate treatment, a zinc phosphate treatment, or a zinc calcium phosphate treatment. Other conversion treatment methods may also be used, provided that the above requirements are met.

Each conversion treatment is described in detail below. Numerous known methods employ chromate treatment solutions. Particularly preferred herein is an acidic aqueous solution of phosphoric acid containing trivalent chromium and hexavalent chromium. A preferred surface is achieved through immersion at low temperature when a small amount of nickel ions is also present, for unclear reasons that may have to do with the catalytic action of the nickel ions in the formation of the chromate layer. More specifically, there is preferably used an aqueous solution, at about 40° C., containing 1 to 1.5% of chromium nitrate, about 0.3% of anhydrous chromic acid, 1.5 to 2% of phosphoric acid and about 0.01 to 0.05% of basic nickel carbonate.

In the zinc phosphate conversion treatment solution, preferably, a small amount of additional nickel ions is also present together with phosphoric acid and divalent zinc. Fluorosilicate ions are also preferably present, as they are effective in eliciting better performance. More specifically, there is preferably used an aqueous solution, at 50 to 60° C., that contains 1 to 1.5% of phosphoric acid, and about 0.2% each of zinc oxide, basic nickel carbonate, and sodium fluorosilicate.

In the zinc calcium phosphate conversion treatment solution, preferably, a small amount of additional nickel ions is also present together with phosphoric acid, divalent zinc and calcium. Zinc calcium phosphate conversion treatment solutions that are superior conversion treatment solutions for steel materials are ineffectual unless at high temperature, ordinarily at 80° C. or higher, but when used in the present invention, however, sufficiently good effects were elicited at 60 to 65° C. Micrographs obtained by electron microscopy are described in the experimental examples set forth below. As a concrete solution composition there is preferably used an aqueous solution containing 1 to 1.5% of phosphoric acid, and about 0.2% each of zinc oxide, basic nickel carbonate and calcium nitrate.

The "new NMT" and "NAT" theories mandate that, ultimately, the scanning results of the rough surface under a scanning probe microscope should reveal a surface having RSm of 0.8 to 10 μm and Rz of 0.2 to 5 μm, and covered by an ultra-fine irregular surface having a period of 5 to 500 nm, more preferably an ultra-fine irregular surface having a period of 30 to 100 nm. When RSm is smaller than about 0.8 μm, the texture period is too small and thus the resin fraction is less likely to penetrate thoroughly, whether in injection bonding or adhesive bonding. By contrast, bonding strength drops significantly when RSm is 10 μm or greater. In this latter case, the recess period and pore diameter are excessively large, and the absolute number of recesses decreases. This results in a dramatically weaker anchor effect and, accordingly, lower bonding strength.

The reason for setting the numerical value of Rz to be about half RSm is that the resins used by the inventors for injection bonding, namely improved PBT-based resin compositions, PPS resin compositions and aromatic polyamide resin compositions can penetrate down to the bottom of the recesses when the latter have a depth of about half the texture period. The same is true of the liquid one-liquid adhesives that can penetrate under pressure differences up to about 1 atmosphere. If Rz is larger, i.e. when the bottom of the irregularities is deeper, the above-mentioned resins do not intrude all the way down, and there arise voids, at the bottom of the micron-scale recesses, that remain after completion of the bonding process and that constitute the phase most susceptible to breakage. High bonding strength cannot be achieved in that case. An excessive small Rz shifts most of the burden of preserving bonding strength to the ultra-fine irregularities, and results ultimately in a drop of bonding strength.

The results of observations of the surface obtained by subjecting the above-described oiled and chromate-treated hot-dip galvanized steel sheet "Z18" to a high-temperature degreasing step, upon ten measurements of roughness using a scanning probe microscope, revealed an RSm ranging from 0.8 to 3 μm, and Rz=0.3 to 1 μm. The Rz value is rather small, and hence irregularities slightly shallow, from the viewpoint of the rough surface postulated by the "new NMT" and "NAT" general theories. The texture period of ultra-fine irregularities under electron microscopy ranged from 80 to 150 nm, and was mostly of about 100 nm, which corresponded to the most preferred period for ultra-fine irregularities. Thus, the shape of the ultra-fine irregularities was particularly appropriate, and hence the shape of the ultra-fine irregularities matches the conditions of "new NMT" and "NAT" when RSm ranges from 0.8 μm to 10 μm and Rz ranges from 0.2 to 5 μm, as described above. Both RSm (0.8 to 3 μm) and Rz (0.3 to 1 μm) thus measured meet the conditions of "new NMT" and "NAT". The appearance of the ultra-fine irregularities resulting from the conversion treatment performed by the inventors is described in the examples set forth below. In all cases, the period of the ultra-fine irregularities fell within the preferred range of 10 to 300 nm.

3. Thermoplastic Resin Composition for Injection Bonding

The resin composition is directly bonded to the galvanized steel sheet by injection molding. The resin composition denotes herein a first resin composition having PBT, which is a crystalline resin, as a main component, a second resin composition having PPS as a main component, or a third resin composition having an aromatic polyamide as a main component. The resin fraction of the first resin composition is a resin composition having PBT as a main component and polyethylene terephthalate (hereafter, "PET") and/or a polyolefin resin as an auxiliary component. The resin fraction of the second resin composition is a resin composition having PPS as a main component and a polyolefin resin as an auxiliary component. The resin fraction of the third resin composition is a resin composition having an aromatic polyamide as a main component and an aliphatic polyamide as an auxiliary component.

In the first resin composition, PBT may range from 70 to 97 wt %, and PET and/or a polyolefin resin from 3 to 30 wt %. In the second resin composition, PPS may range from 70 to 97 wt %, and the polyolefin resin from 3 to 30 wt %. In the third resin composition, the aromatic polyamide may range from 50 to 100 wt %, and the aliphatic polyamide from 0 to 50 wt %. Injection bonding strength drops significantly outside the above ranges.

Preferably, the resin composition is PPS or PBT comprising 20 to 60 wt %, relative to the entire composition, of one or more types of filler selected from among glass fibers, carbon fibers, aramid fibers and other reinforcing fibers, calcium carbonate, magnesium carbonate, silica, talc, clay and glass powder. The presence of the above fillers causes the coefficient of linear expansion of the resin molded article to range from about $2.0 \times 10^{-5}$ °C.$^{-1}$ to $3.0 \times 10^{-5}$ °C.$^{-1}$, close to the coefficient of linear expansion of the metal alloy. As a result, internal strain generated at the joining faces during temperature changes can be kept at a low level.

4. Composite Manufacture/Injection Bonding Using a Thermoplastic Resin

The composite manufacturing method according to the present invention is an injection molding method wherein a metal alloy is inserted into a mold, as follows. To manufacture a composite, an injection mold is prepared, and a shape comprising a galvanized steel sheet is inserted into the mold. The mold is closed, and the improved PBT, improved PPS or improved aromatic polyamide thermoplastic resin composition is injected. After solidification, the mold is opened and the resulting composite is demolded.

Injection conditions are explained next. Preferably, the mold temperature is 100° C. or higher for PBT or PPS resins, since that temperature affords superior composite productivity with little impact on resulting strength, in particular after solidification. More preferably, the mold temperature is 120° C. or higher. The injection temperature, injection pressure and injection rate are not particularly different from those of ordinary injection molding. If anything, the injection pressure and the injection rate are preferably rather high.

5. Composite Manufacture/Conversion Treatment of a Metal Resin Integrated Product The galvanized steel sheet surface-treated as described above exhibits a thinner plating layer as compared to the sheet before the surface treatment. A conversion coating layer is formed on the plating layer. In injection bonding through insertion of such a steel sheet into an injection mold, the steel sheet is often bent by being squeezed in the mold. In such instances, the conversion coating layer may break, or the plating layer may be stretched and further thinned out. Therefore, the composite obtained by injection bonding is preferably subjected again to a conversion treatment after integration. Bonding strength is seldom impaired if the composite is rapidly subjected to the repeated conversion treatment and is dried as quickly as possible.

6. Thermoplastic Resin Composition for Press-Fusion Bonding

The resin composition used for press-fusion bonding may be a resin composition having a hard, highly crystalline resin as a main component. In press-fusion bonding according to "new NMT", the resin used can be PBT, PPS, an aromatic polyamide, an aliphatic polyamide, a liquid crystal polymer, polyether ether ketone (hereafter, "PEEK") or the like. The melting point of PEEK is excessively high, of about 400° C., and hence and undesirable for press-fusion bonding of galvanized steel sheets, since the melting point of PEEK is close to that of zinc. As the above-described thermoplastic resin for injection bonding there can be used, needless to say, the improved PBT, PPS or aromatic polyamide resins employed for injection bonding. In short, there can be used a hard, highly crystalline resin from among a broader range of resins than the above-described thermoplastic resin for injection bonding. Particularly preferred are, for instance, PBT, PPS and polyamide resins, since they have not too high a melting point.

A resin composition having the above resins as a resin fraction may comprise 20 to 60 wt %, relative to the entire composition, of one or more types of filler selected from among glass fibers, carbon fibers, aramid fibers and other reinforcing fibers, calcium carbonate, magnesium carbonate, silica, talc, clay and glass powder. The filler may take up 0 to 50% of the liquid crystal polymer. The presence of the above fillers has the effect of lowering the coefficient of linear expansion of the resin molded article.

7. Composite Manufacture/Press-Fusion Bonding Using a Thermoplastic Resin

The resin fraction of the resin composition used in a composite manufacturing method relying on press-fusion bonding is preferably a hard, highly crystalline resin, specifically PBT, PPS, an aromatic polyamide, an aliphatic polyamide, a liquid crystal polymer or the like. Needless to say, improved PBT, improved PPS and improved aromatic polyamide resin compositions that can be suitably used in injection bonding fall also within this category and are thus preferably used. To manufacture the resin molded article, the glass fibers and other fillers are compounded and blended into the resin composition, and the resulting starting material blend is injected into an injection molding machine.

Next, a galvanized steel sheet having been surface-treated as described above is heated by means of, for instance, a hot plate, a hot-air dryer or the like, to a temperature even at or low not lower than the melting point of the resin composition that is to be bonded. The above-described resin molded article is then pressed against the surface of the heated steel sheet. The feature "not lower than the melting point" denotes herein heating to a temperature higher than the melting point by about several tens of ° C. and that enables the below-described operations. Zinc has a low melting point, of about 400° C. When using zinc as a metal, thus, it is preferable not to employ high-melting point polymers such as PEEK or the like. Instead, there are preferably used resins that restrict heating during the heating process up to about 300° C.

A preferred operation procedure is outlined below. Firstly, the surface-treated galvanized steel sheet is heated up to a predetermined temperature. The heated steel sheet is then temporarily transferred onto a heat-insulating plate, and the prepared resin molded article is pressed against the steel sheet thus disposed. The bottom face of the pressed resin molded article melts, and the heat dissipates thereafter, to elicit crystallization and solidification once more. During the above process, the molten resin gets into the recesses, and into the ultra-fine irregularities, that make up the micron-scale roughness on the steel sheet surface. Once the molten resin has penetrated, it is cooled and solidified once more, to bring bonding about. To achieve good bonding strength reproducibility, the whole is placed in vacuum and is reverted thereafter to normal pressure, over a few seconds to ten or more seconds while the resin is still in a molten state. To that end, there is prepared a jig appropriate for press-fusion bonding, and the jig is combined with a vacuum pump. Press-fusion bonding can be performed thereby in a suitable manner with good reproducibility. An example of press-fusion bonding is set forth in the experimental examples.

8. One-Liquid Thermosetting Adhesive

According to the "NAT" theory, bonding is preferably elicited by a thermosetting adhesive that is liquid when applied, and that has few macromolecules (gelling molecules). Specifically, the thermosetting adhesive must penetrate into recesses having a period of several μm on the surface of a metal alloy (zinc plated steel material), and must penetrate also into the crevices of ultra-fine irregularities, having a period of several tens of nm, that are present within the recesses. Therefore, the viscosity of the liquid must be at most no greater than 20 Pa·s, preferably no greater than about ten or more Pa·s, during the cycles of depressurization/return to normal pressure described below.

The adhesive may be coated onto the surface-treated galvanized steel sheet, and be then heated at 50 to 80° C. in a vessel, for instance by being placed in a warmed desiccator. The operation of depressurization/return to normal pressure is performed with the steel sheet at the same temperature as that of the vessel. A paste-like adhesive composition having a viscosity of several hundred Pa·s at normal temperature can be used as well, by being liquefied through heating at 50 to 80° C. However, the degree of penetration of the adhesive into the crevices of the ultra-fine irregularities is poor if the adhesive undergoes gelling or the like under such heating. In case of using such high-viscosity adhesives, therefore, the gelling and curing temperature of the adhesive is preferably high.

The epoxy adhesive is described in further detail next. Commercially-available one-liquid epoxy adhesives include, for instance, bisphenol epoxy resins, glycidylamine epoxy resins, polyfunctional polyphenol-type epoxy resins, alicyclic epoxy resins and the like, to which amine compounds or dicyandiamide are added as curing agents. These adhesives can have a comparatively low viscosity, and are easy to work with, although they exhibit lower heat resistance than the types described below.

Many aromatic amine compounds are solid, and thus a mixture of the foregoing has to be melted once, thereby making manufacture impossible, when using the aromatic amine compound as a curing agent. At normal temperature, the mixture has a higher viscosity and is solid, in the form of a paste. Although the resulting cured product has characteristically high heat resistance, such a cured product is difficult to work in the present invention (in terms of penetrating into the metal alloy surface) after coating, since the viscosity of the cured product is somewhat too high.

An acid anhydride can be used as the curing agent. A thermosetting adhesive formed from an epoxy resin and an acid anhydride can be preferably used since acid anhydrides can be produced as low-viscosity liquids. Such adhesives are not commercially available, since after mixing, the adhesive gels, albeit slowly, when stored at normal temperature. In terms of quality assurance, therefore, it is difficult to purchase commercially available mixtures. When such adhesives are required, the current ordinary procedure involves procuring the epoxy resin and the acid anhydride, and compounding these two at the time of use.

The mixture is considered to start gelling at around room temperature, but in fact the curing temperature is often high, of 150° C. or higher, and the polymerization temperature is likewise high. Accordingly, the epoxy resin (adhesive composition) having an acid anhydride compounded therein may be stored several days in a refrigerator without any problems. In this sense, although an epoxy adhesive having an acid anhydride added thereto is a two-liquid epoxy adhesive, it is classified essentially as a one-liquid thermosetting adhesive in the present invention. Such adhesives can be preferably used, since they yield cured products having excellent heat resistance.

(Use of a Two-Liquid Thermosetting Adhesive)

When using a two-liquid thermosetting adhesive in a metal alloy surface-treated as described above, bonding strength is enhanced, although the effect elicited is hard to discern. Most two-liquid adhesives start gelling from the instant that the curing agent component is added to, and mixed with, the main liquid. As gelling proceeds, less resin component penetrates into the crevices of the (2) ultra-fine irregularities. When a two-liquid adhesive is used, changes in adhesive strength as time goes by, after mixing with the curing agent, are a common occurrence. This impairs stability and reproducibility, and is hence undesirable. Nevertheless, as mentioned earlier, two-liquid adhesives in the form of epoxy adhesive using an acid anhydride as a curing agent are preferably used in case that a certain time elapses until the onset of gelling and in case that the gelling temperature is high. Such adhesives can be handled substantially in the same way as one-liquid adhesives.

The same is true of phenolic adhesives and unsaturated polyester adhesives. Phenolic adhesives are commercially available, but many have added solvent, and as in the case of many epoxy adhesives, are not solvent-less. However, letting the adhesive solidify through solvent evaporation shortly after application, followed by depressurization/return to normal pressure at a moderate temperature of 50 to 70° C., allows the phenolic resin remaining after solvent evaporation to melt into a viscous liquid of about 10 Pa·s. As a result, the adhesive can penetrate into the ultra-fine irregularities and drive out the air present in the latter.

Although no unsaturated polyester adhesives are commercially available, there are marketed many kinds of unsaturated polyester components used for manufacturing glass fiber-reinforced plastic (hereafter "GFRP" for short). Organic peroxides for thermal curing by being mixed into the foregoing are also commercially available. When the two are mixed according to an appropriate recipe, gelling does not occur at once. Instead, gelling and solidification proceed as the temperature is raised. Such a mixture can therefore be used substantially as a one-liquid thermosetting adhesive.

Despite being two-liquid thermosetting adhesives, therefore, the latter can be preferably used so long as they have a high gelling temperature, that the gelling rate after mixing with the curing agent is very slow around normal temperature, and that the resulting mixture has a viscosity range no greater than several hundred Pa·s. Organic peroxides having a very high decomposition temperature can be used as curing agents of unsaturated polyesters. Unsaturated polyesters include alkyd and vinyl ester types. Stronger adhesive strength itself is achieved when using an unsaturated polyester of vinyl ester type, in particular an unsaturated polyester of vinyl ester type manufactured out of an epoxy resin and methacrylic acid.

9. Manufacture of a Composite/Adhesive Bonding Using a Thermosetting Adhesive

Epoxy, phenolic and unsaturated polyester adhesives can be preferably used, as described above. Numerous epoxy and phenolic adhesives having excellent adhesive performance are marketed. The adhesive must be in liquid form when applied. High-viscosity adhesives that are solid at normal temperature can have the viscosity thereof lowered to arguably that of a liquid, of ten or more Pa·s, through heating at 50 to 80° C. It is preferable to exploit this phenomenon, inasmuch as epoxy adhesives are a typical instance of such high-viscosity adhesives. The explanation below focuses therefore on an instance where epoxy adhesives are used.

A large vessel, such as a desiccator or the like, capable of being depressurized, is prepared first. The desiccator is warmed by being placed in a warm-air dryer for about one hour. Meanwhile, a galvanized steel sheet surface-treated as described above is prepared, and the adhesive is coated onto required sites of the sheet. The desiccator is taken out of the warm-air dryer, and the steel sheet, coated with the adhesive, is placed in the desiccator. The desiccator is closed and is evacuated, by way of a vacuum pump, down to several tens of mmHg to several mmHg. The reduced-pressure state is maintained for a while, and then the pressure is reverted back to normal. This operation of depressurization/return to normal pressure is repeated. As a result of the above operations, the adhesive, which melts into a liquid on account of the residual heat of the desiccator, is sucked into the ultra-fine irregularities on the surface of the steel material.

The steel sheet is taken out of the desiccator. The steel sheet and the adherend are closely adhered and fixed to each other, after which the whole is placed in a hot-air dryer. A temperature of 100 to 135° C. is held for several tens of minutes to several hours, during which gelling proceeds. Thereafter, the temperature is raised from 150 to 200° C. and is held there for about several tens of minutes to about several hours, during which curing takes place. The temperature setting varies widely depending on the curing agent system. Specifically, the temperature varies depending on the epoxy resin and the curing agent type. The point is that good bonding is elicited when gelling proceeds smoothly. If the temperature is raised too high too fast, gelling and curing occur in a runaway fashion, which ultimately results in a lower adhesive strength.

Galvanized steel sheets can be joined to each other by using an identical galvanized steel sheet as the adherend. Also, the galvanized steel sheet can be joined to another metal alloy, for instance a metal alloy other than a similar steel sheet surface-treated in accordance with the "NAT" theory, such as surface-treated stainless steel. Carbon fiber-reinforced plastic (hereafter "CFRP" for short) is an ultra-lightweight, high-strength material that has a matrix of epoxy resin. Uncured CFRP (i.e. CFRP prepreg) and a galvanized steel sheet coated with an epoxy adhesive are affixed to each other by way of clips. In this affixed state, the whole is heated in a hot-air dryer to cure the entire epoxy component, whereupon the epoxy adhesive and the CFRP portion solidify competitively. A strong integrated product of the galvanized steel sheet and the CFRP can be obtained as a result.

When using a phenolic adhesive as the adhesive, strong joining is achieved between abrasive materials or friction materials having a phenolic resin matrix. Also, GFRP having an unsaturated polyester resin matrix can be easily joined when using an unsaturated polyester adhesive as the adhesive. In the case of both CFRP and GFRP, an adhesive-coated galvanized steel sheet and prepreg are brought into contact with each other, are fixed, and are subjected to thermal curing in that state, whereupon the adhesive and the prepreg become fixed to each other, thereby yielding a composite in which the galvanized steel sheet and the FRP are strongly joined and integrated together.

10. Applications

The present invention, which provides a technology for strongly bonding a galvanized steel sheet and an adherend (metal alloy or resin molded article or FRP), can be used in various fields. The above technology, specifically, can be used in, for instance, construction materials, outdoors equipment, construction machinery parts, and in the manufacture parts in ordinary equipment. The technology of the invention enables novel design approaches in the manufacture of such elements. The present invention lays the basic technology for manufacturing parts relating to galvanized steel sheets, and can thus be expected to find application in fields other than the above. In all cases, the technology should contribute to improving the performance and productivity of various parts.

In the composite of the present invention, as explained in detail above, a resin molded article and a galvanized steel sheet are strongly integrated together in such a manner that they do not readily come apart. Thus, a composite can be manufactured in which a galvanized steel sheet and a resin molded article are strongly integrated together, by subjecting a galvanized steel sheet to a predetermined surface treatment, and through injection bonding of a thermoplastic resin composition comprising 70 to 97 wt % of PBT and 30 to 3 wt % of PET and/or a polyolefin resin; a thermoplastic resin composition comprising 70 to 97 wt % of PPS and 3 to 30 wt % of a polyolefin resin; or a thermoplastic resin composition comprising both an aromatic polyamide and an aliphatic polyamide.

Alternatively, a temporary resin molded article is manufactured, by injection molding, using a thermoplastic resin composition that comprises, for instance, PBT, PPS, a polyamide or a liquid crystal polymer, while a galvanized steel sheet is subjected to a surface treatment according to the present invention. The surface-treated galvanized steel sheet is then heated, and the above resin molded article is pressed against the galvanized steel sheet, to elicit press-fusion bonding therebetween. As a result there can be manufactured a composite in which the galvanized steel sheet and the resin molded article are integrated together. Further, the present invention allows strongly joining a galvanized steel sheet with an adherend (metal alloy and CFRP) by subjecting a galvanized steel sheet to a predetermined surface treatment, and by using for instance a commercially-available epoxy adhesive.

BEST MODE FOR CARRYING OUT THE INVENTION

Embodiments of the present invention are explained below.

Injection Bonding Method

Figure 1:
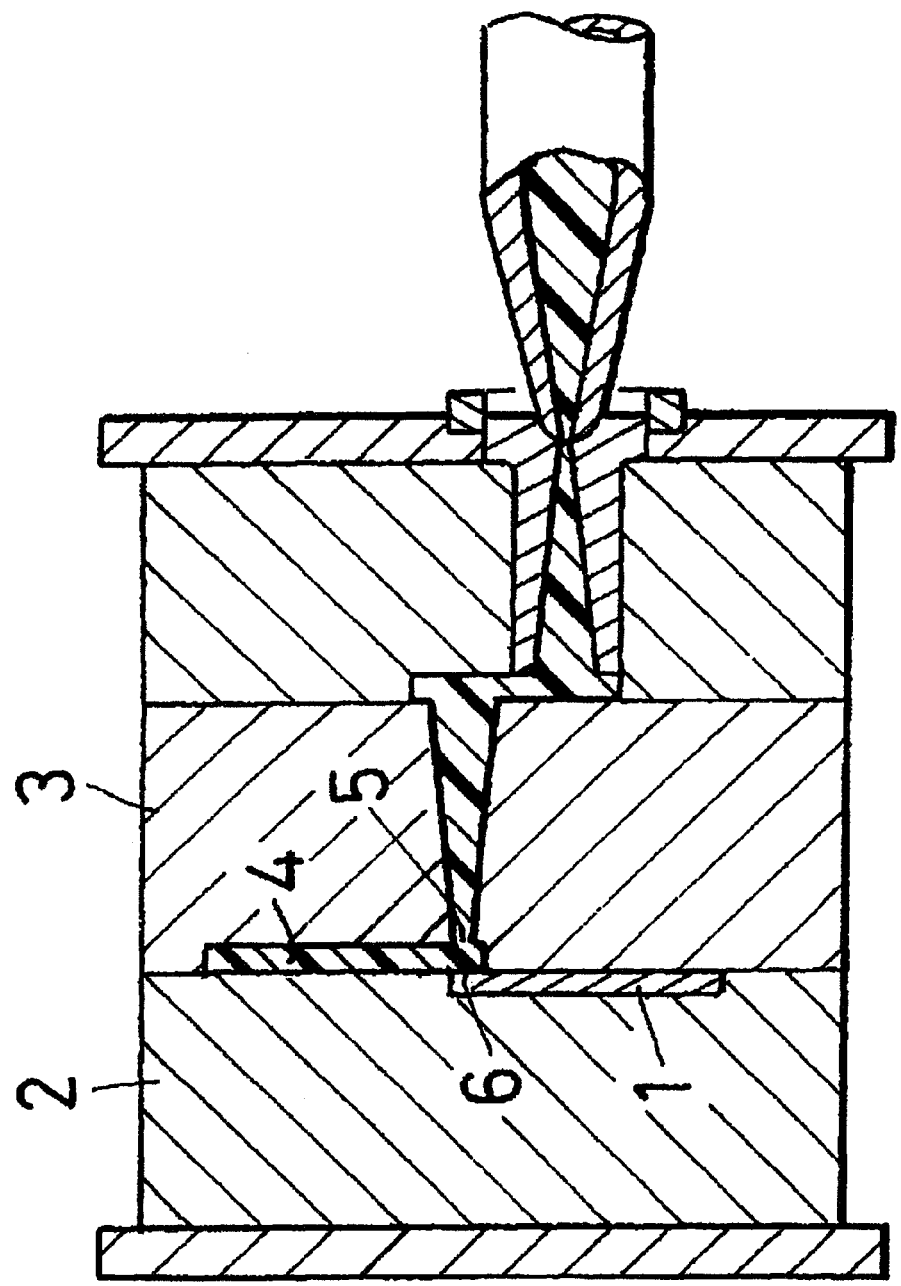
FIG. 1 is a cross-sectional diagram of an injection mold for manufacturing a composite through injection of a thermoplastic resin composition onto a galvanized steel sheet.
Figure 2:
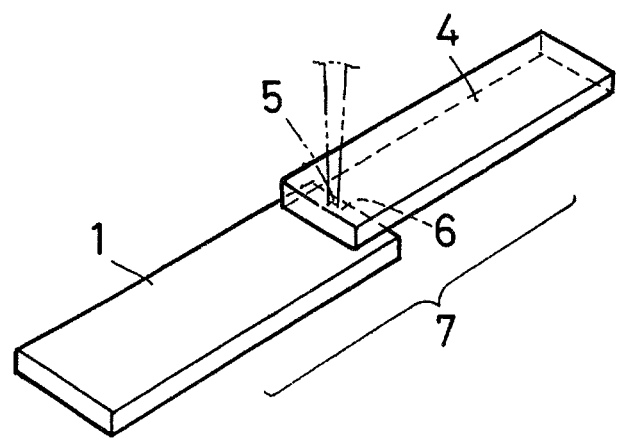
FIG. 2 is a diagram illustrating the shape of a composite of a resin molded article and a galvanized steel sheet, obtained by injection bonding.

FIG. 1 and FIG. 2 are diagrams relating to injection bonding of a thermoplastic resin. FIG. 1 is a cross-sectional diagram illustrating schematically an injection mold used in the below-described experimental examples. FIG. 1 illustrates injection molding with the mold in a closed state. FIG. 2 is an external-view diagram of a composite 7 comprising a galvanized steel sheet and a resin molded article molded in an injection mold. The injection mold comprises a movable mold plate 2, a stationary mold plate 3, and a resin injector comprising a pinpoint gate 5, a runner and so forth, on the side of the stationary mold plate 3.

The composite 7 is molded in accordance with the following procedure. Firstly, the movable mold plate 2 is opened and a galvanized steel sheet piece 1 is inserted into the cavity formed between the movable mold plate 2 and the stationary mold plate 3. After insertion, the movable mold plate 2 is closed, which results in the state before injection in FIG. 1. A molten resin composition is then injected, via the pinpoint gate 5, into the cavity in which the galvanized steel sheet piece 1 has been inserted.

Upon injection, the resin composition becomes joined to an end of the galvanized steel sheet piece 1 and is molded by filling the cavity. As a result, a composite 7 is obtained in which the galvanized steel sheet piece 1 and the resin molded article 4 are integrated together. The composite 7 has a joining face 6 between the galvanized steel sheet piece 1 and the resin molded article 4. The surface area of the joining face 6 is 5 mm×10 mm. Accordingly, the surface area of the joining face 6 is 0.5 cm².

Press-Fusion Bonding Method

Figure 3:
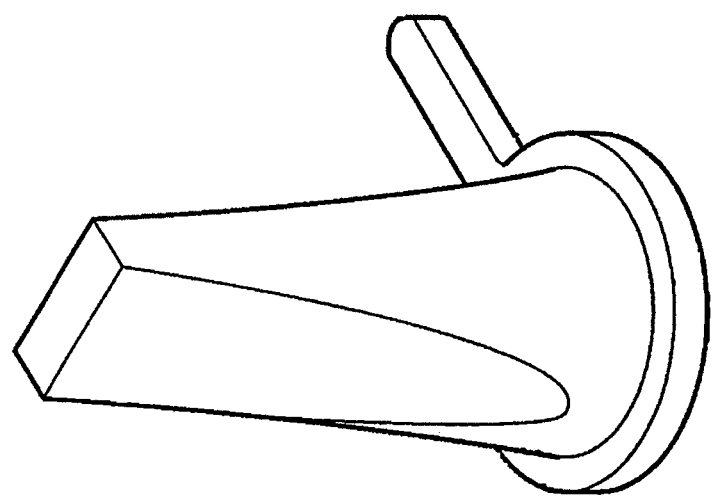
FIG. 3 is a diagram illustrating the shape (boss shape) of a molded article of a thermoplastic resin used in press-fusion bonding.
Figure 4:
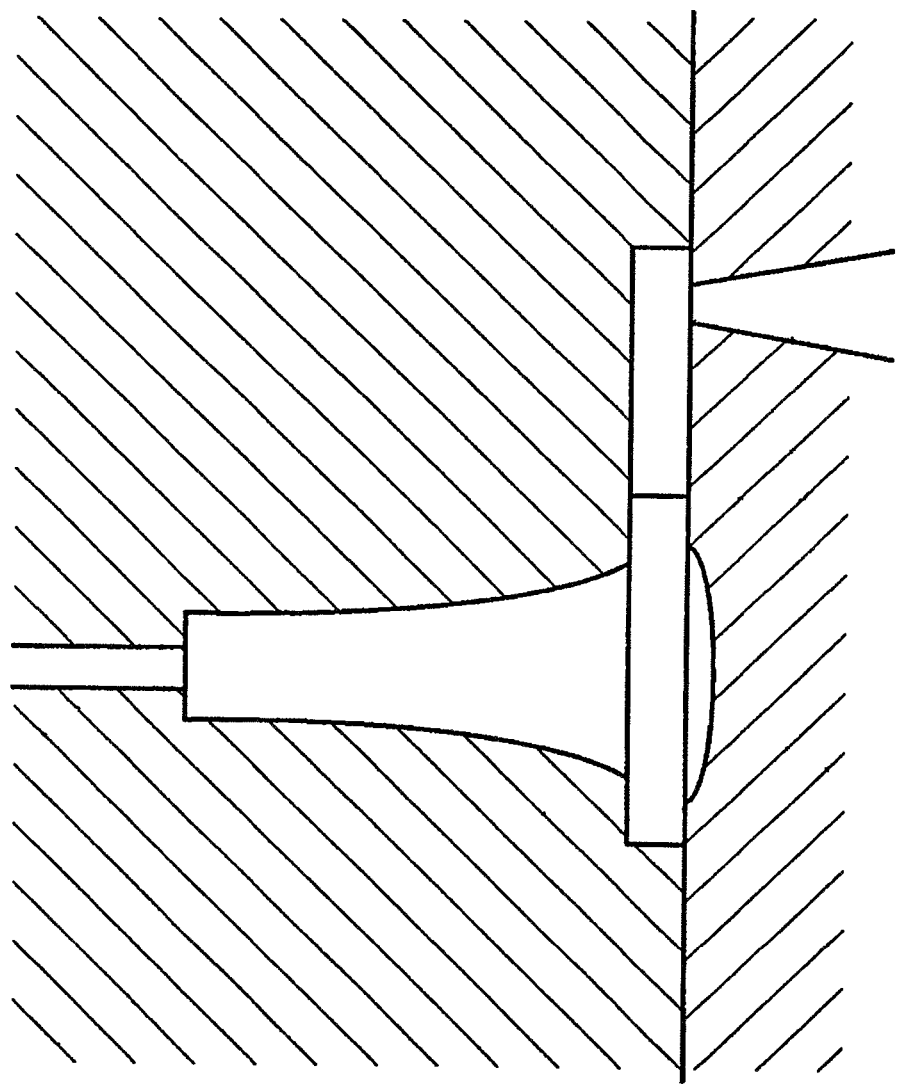
FIG. 4 is a side-view diagram of a molded article of a thermoplastic resin used in press-fusion bonding.

FIGS. 3-7 are diagrams relating to press-fusion bonding a galvanized steel sheet piece and a resin molded article. FIG. 3 is a diagram illustrating the shape of a molded article of a thermoplastic resin used in the below-described experimental examples. FIG. 4 illustrates an example of shape design in which the above-described resin molded article is shaped as a boss having a protrusion jutting about 0.1 mm outwards from the center of the boss bottom. When forming a filled-type boss shape by injection bonding, the center of the boss bottom sinks inevitably on account of molding shrinkage by the resin composition. Parts with a sunk bottom are not preferred for press-fusion bonding. Such parts should therefore be designed beforehand in such a manner that the center of the bottom thereof bulges out. As a result, the central portion of the boss bottom bulges preferably out by about 0.1 mm, or at worst is flat, although molding may rely on a pin gate, as illustrated in FIG. 4.

Figure 5:
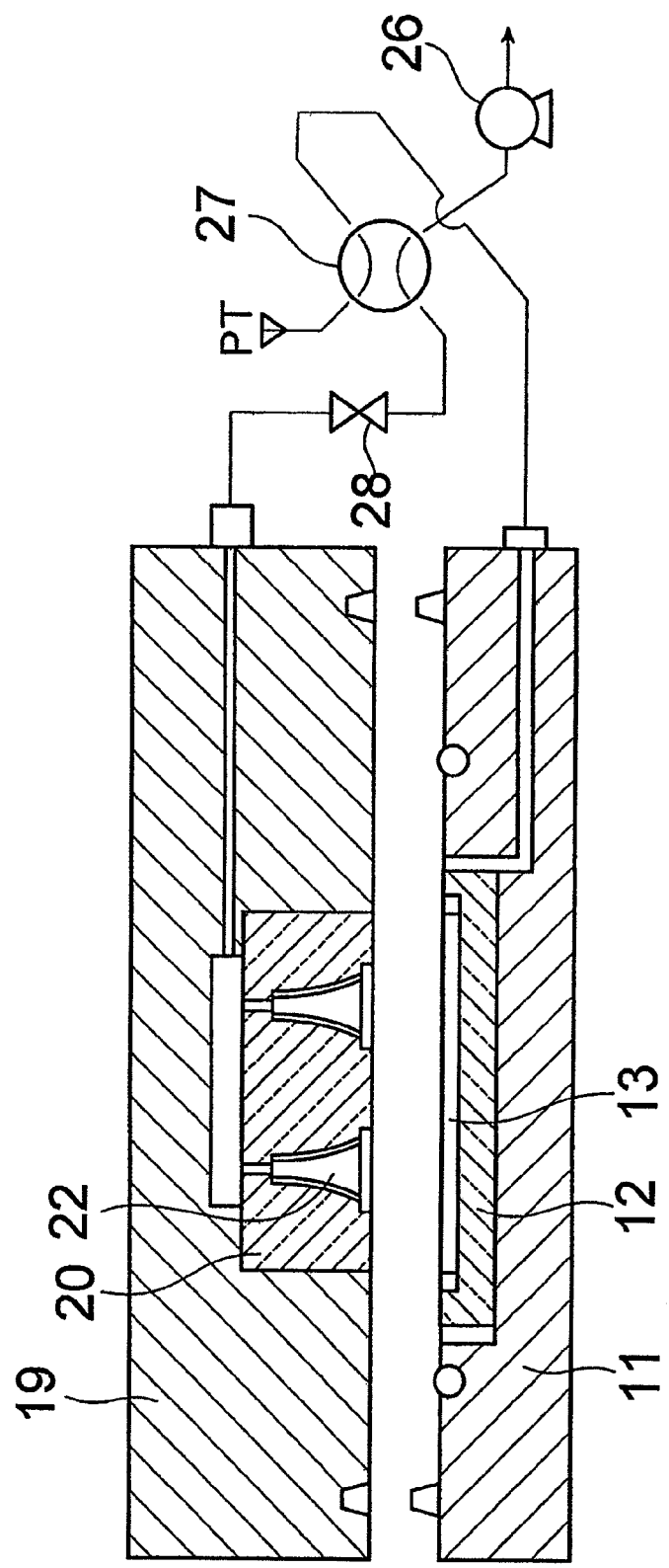
FIG. 5 is a cross-sectional diagram of a jig used for press-fusion bonding a resin molded article onto a galvanized steel sheet.

FIG. 5 illustrates an example of a jig for manufacturing a composite wherein two bosses are fusion-bonded to a galvanized steel sheet piece by press-fusion bonding. A galvanized steel sheet piece 13, heated using a hot plate or the like, is placed in a recess provided on the top face of a heat-insulating material 12 that is built into a jig lower die 11. A jig upper die 19, together with a resin molded article 22 (article extending from the boss up to the cutoff at the runner in FIG. 3) set beforehand in the jig upper die 19, are pushed against the jig lower die 11. A two-way stopcock 28 is opened at substantially at the same time, whereupon the entire system, having a line connected to a vacuum pump 26 driven beforehand, is depressurized to several mmHg. After several seconds, a four-way stopcock 27 is turned 90 degrees to revert the entire system to normal pressure. As a result of the above series or operations, the bottom of the molten resin molded article 22 comes into contact with the galvanized steel sheet piece 13, whereupon the resin melt penetrates readily into the micron-scale recesses, and into the ultra-fine irregularities, on the surface of the galvanized steel sheet piece 13.

Figure 6:
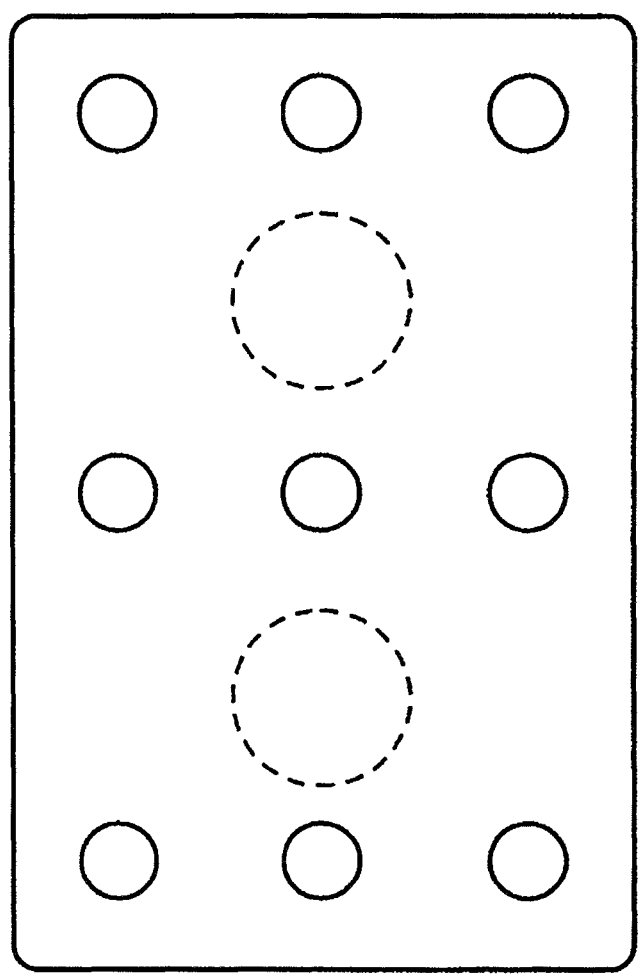
FIG. 6 is a plan-view diagram of a galvanized steel sheet used in press-fusion bonding.
Figure 7:
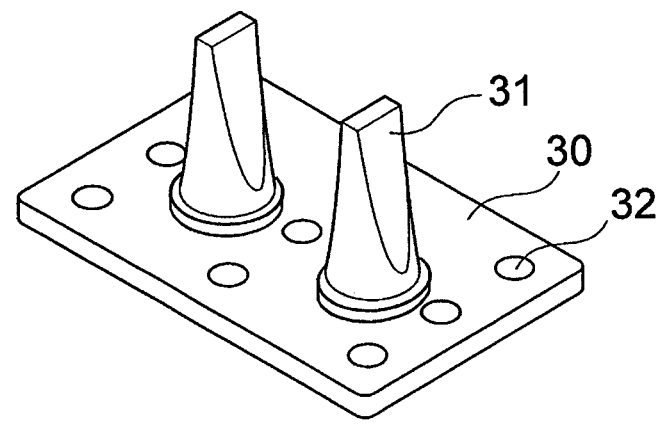
FIG. 7 is a diagram illustrating the shape of a composite of a resin molded article and a galvanized steel sheet, obtained by press-fusion bonding.

The melt solidifies upon subsequent cooling, and then the jig upper die 19 is lifted off the jig lower die 11, and the adhered composite 30 is demolded from the press-fusion bonding jig. The obtained composite 30 is preferably annealed for about 1 hour. The annealing temperature varies depending on the melting point of the resin composition, but is preferably of about 150° C. for PBT and polyamides, and about 170° C. for PPS or the like. FIG. 6 illustrates the shape of the galvanized steel sheet piece 13 that is to be press-fused, and which is set in the jig lower die 11 illustrated in FIG. 5. As illustrated in FIG. 6, a plurality of screw holes 32 for carrying out tensile tests are drilled in the galvanized steel sheet piece 13. The galvanized steel sheet piece having a plurality of the screw holes 32 provided therein is press-fused to the resin molded article 31, to yield ultimately the composite 30, as illustrated in FIG. 7.

Method for Joining a Galvanized Steel Sheet Piece and a Metal Alloy Piece

Figure 11:
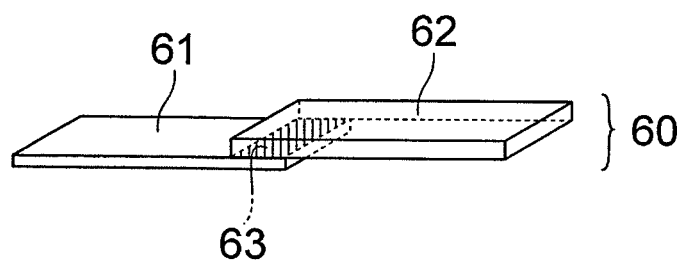
FIG. 11 is a diagram illustrating the shape of a bonded body in which galvanized steel sheets are joined to each other by way of a one-liquid thermosetting adhesive.
Figure 12:
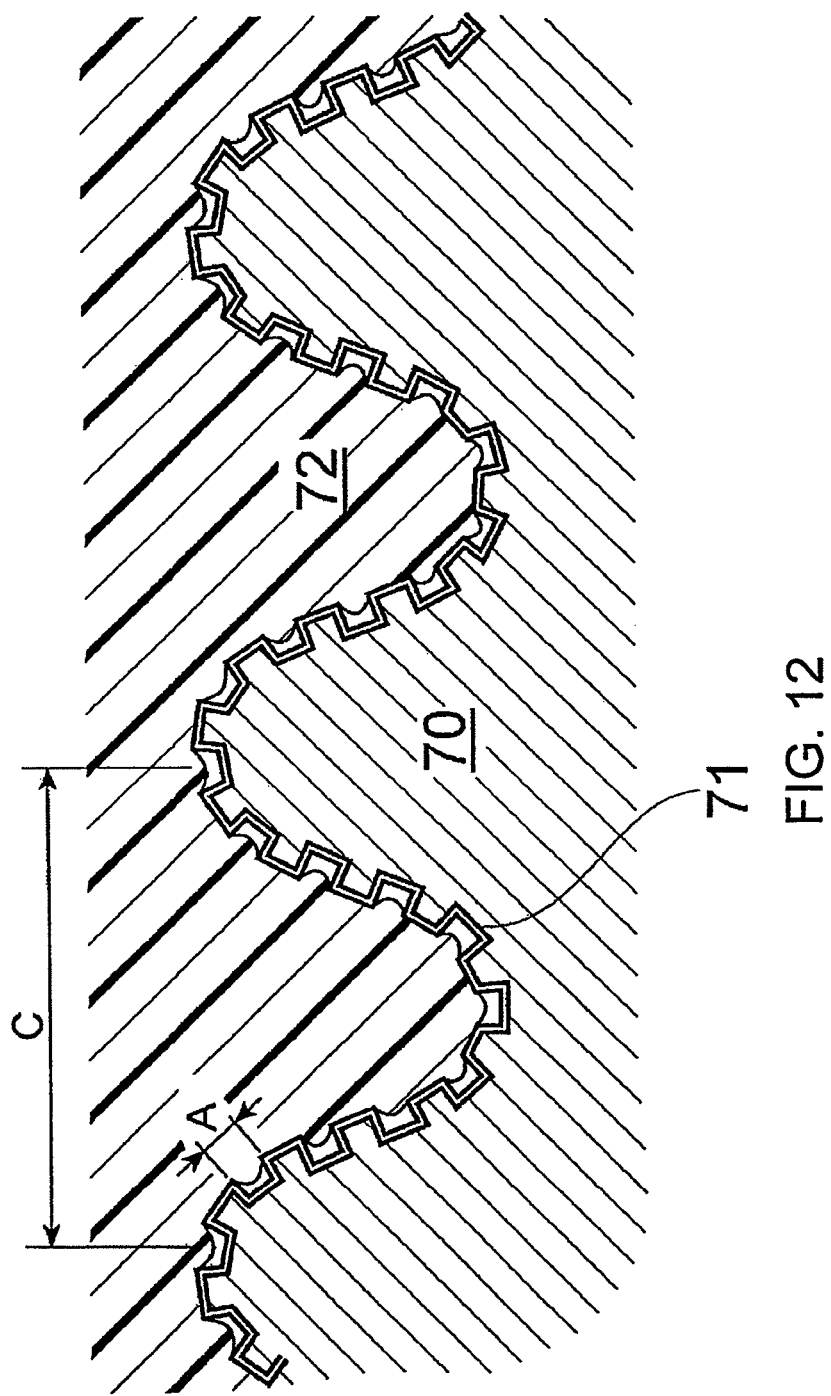
FIG. 12 is a cross-sectional diagram illustrating the surface structure of a metal alloy in new NMT and NAT.

FIG. 11 illustrates the shape of a bonded body 60 obtained by bonding two galvanized steel sheet pieces (61, 62) to each other by way of an adhesive. FIG. 11 will be referred to in the experimental examples set out below. The galvanized steel sheet pieces 61, 62 are both 45 mm×18 mm pieces, and the adhesion area therebetween (surface area of the hatched portion 63 in FIG. 11) is about 0.5 to 0.6 cm². Shear rupture strength is measured by pulling on the bonded body 60 until breakage. One of the pieces that make up the bonded body 60 may be not a galvanized steel sheet piece, but a piece of a dissimilar metal alloy. Particularly strong bonding strength is achieved when the metal alloy is an aluminum alloy, a magnesium alloy, a copper alloy, a titanium alloy, stainless steel or an ordinary steel material, having been surface-treated in accordance with "NAT".

Method for Bonding a Galvanized Steel Sheet Piece and a CFRP Piece

Figure 9:
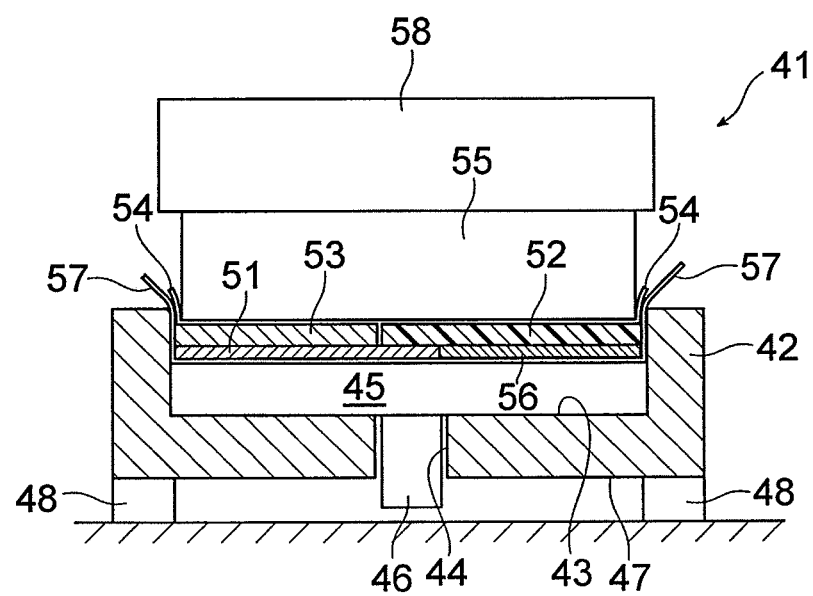
FIG. 9 is a cross-sectional diagram of a baking jig for bonding, and thermally curing, CFRP to a galvanized steel sheet by way of a one-liquid thermosetting adhesive.
Figure 10:
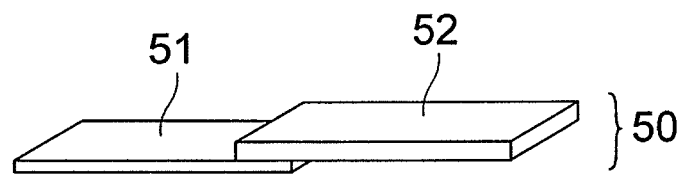
FIG. 10 is a diagram illustrating the shape of a composite in which a galvanized steel sheet and CFRP are joined by way of a one-liquid thermosetting adhesive.

FIG. 9 illustrates a baking jig 41 of a composite of a CFRP piece and a galvanized steel sheet piece. FIG. 10 illustrates the shape of a composite 50 of a CFRP piece 52 and a galvanized steel sheet piece 51 obtained using the baking jig 41. The baking jig 41 has a mold body 42 and a rectangular mold recess 43 opened on the top face of the mold body 42. A mold through-hole 44 is formed in the bottom of the mold body 42.

A bottom plate projection 46 is inserted through a mold through-hole 44 in the underside of the mold bottom plate 45. The bottom plate projection 46 projects out of a mold bottom face 47 of the mold body 42. The bottom face of the mold body 42 rests on a mold seat 48. With the mold bottom plate 45 inserted in the mold recess 43 of the mold body 42, a composite 50 is manufactured through baking of the galvanized steel sheet piece 51 and the CFRP piece 52, joined by way of an adhesive, as illustrated in FIG. 10. The composite 50 is manufactured in accordance with the procedure outlined below. Firstly, a demolding film 57 is laid over the entire surface of the mold bottom plate 45. Next, a plate-like spacer 56 and the galvanized steel sheet piece 51 having an adhesive coated thereon are placed on the demolding film 57. A desired CFRP prepreg is laid on the end of the spacer 56 and the galvanized steel sheet piece 51. The space between the stacked CFRP prepreg (which constitutes the CFRP piece 52 after curing) and the inner wall face of the mold body 42 is occupied by a spacer 53.

A demolding film 54 is overlaid so as to cover the spacer 53 and the stacked CFRP prepreg. A weight in the form of a PTFE block 55 of PTFE (polytetrafluoroethylene resin) is placed on the demolding film 54. A weight 58 of several hundred g is further laid thereon. The entire baking jig is then placed, in this state, in a hot-air dryer, where the CFRP prepreg is cured and left to cool. Thereafter, the weights 58, the seat 48 and so forth are removed, and the lower end of the bottom plate projection 46 is pushed against the floor. In doing so, the bottom plate projection 46 is pushed and only the mold body 42 is brought down and the composite 50, resulting from joining and bonding of the CFRP piece 52 (cured CFRP prepreg) and the galvanized steel sheet piece 51, is removed from the mold body 42, together with the demolding films 54, 57. The spacers 53, 56 and the demolding films 54, 57 are non-adhesive materials, and can thus be easily stripped off the CFRP piece 52.

The instruments used in the present invention were as follows.

Measurement of PPS Melt Viscosity

The melt viscosity is measured using a Koka type flow tester "CFT-500 (by Shimadzu)" equipped with a die of 1 mm in diameter and 2 mm long, at a measurement temperature of 315° C., and a load of 98 N (10 kgF).

Observation of the Galvanized Steel Sheet Surface (a) XPS Observation Using an X-Ray Photoelectron Spectrometer The galvanized steel sheet surface was analyzed (XPS observation) using a photoelectron spectrometer that, for instance, determines elements qualitatively by analyzing the energy of photoelectrons that are emitted by a sample when the latter is irradiated with X-rays. The photoelectron spectrometer used herein was "AXIS-Nova" (by Kratos Analytical/Shimadzu), which affords observations to a depth of several nm over a surface several μm across.

(b) Electron Microscopy

The surface of galvanized steel sheets was observed using electron microscopes. The electron microscopes employed were a scanning (SEM) electron microscope "S-4800" (by Hitachi) and "JSM-6700F" (by JEOL), at 1 to 2 kV.

(c) Scanning Probe Microscopy

The surface of galvanized steel sheets was observed using a scanning electron microscope. The microscope is a scanning probe microscope "SPM-9600 (by Shimadzu)" wherein a probe in the form of a sharp-tip needle traces the surface of a substance, to observe thereby the magnified surface morphology.

Measurement of the Adhesive Strength of Composites

Shear rupture strength was measured in the form of the rupture strength upon breakage of the composite when the latter is acted upon by a tensile shear force in a tensile tester. A tensile tester "Model 1323 (Aikoh Engineering, Japan)" was used to measure shear rupture strength, at a pulling rate of 10 mm/minute.

Preparative Example 1

Preparation of PPS Composition

A 50 L autoclave equipped with a stirrer was charged with 6214 g of a sodium sulfide (nonahydrate) $Na_2S.9H_2O$ and 17000 g of N-methyl-2-pyrrolidone. The temperature was gradually raised to 205° C. under stirring and under a nitrogen gas stream, and 1355 g of water were distilled off. The system was cooled to 140° C., after which 7160 g of p-dichlorobenzene and 5000 g of N-methyl-2-pyrrolidone were added. The system was sealed under a nitrogen gas stream. The temperature of the system was raised to 225° C. over 2 hours, whereupon polymerization proceeded for 2 hours at 225° C. Thereafter, the temperature of the system was raised to 250° C. over 30 minutes, whereupon polymerization proceeded for another 3 hours at 250° C. Once polymerization was over, the system was cooled to room temperature and the resulting polymer was separated in a centrifugal separator. The solid fraction of the polymer was repeatedly washed with warm water and was dried overnight at 100° C. The resulting PPS (hereinafter referred to as PPS (1)) exhibited a melt viscosity of 280 poise.

This PPS (1) was further cured for 3 hours at 250° C. in a nitrogen atmosphere to yield a PPS (2). The melt viscosity of the obtained PPS (2) was 400 poise.

Next, 6.0 kg of the resulting PPS (2), 1.5 kg of an ethylene-acrylic ester-maleic anhydride terpolymer "Bondine TX8030 (by Arkema)" and 0.5 kg of epoxy resin "Epikote 1004 (by Japan Epoxy Resin)" were mixed uniformly beforehand in a tumbler. Thereafter, melt kneading was carried out in a biaxial extruder "TEM-35B (by Toshiba Machine)" at a cylinder temperature of 300° C., under supply of glass fibers having an average fiber diameter of 9 μm and a fiber length of 3 mm "RES03-TP91 (made Nippon Sheet Glass)" through a side feeder, to an addition amount of 20 wt %. A pelletized PPS composition (1) was obtained as a result. The obtained PPS composition (1) was dried for 5 hours at 175° C.

Preparative Example 2

Preparation of PPS Composition (2)

The PPS (1) obtained in Preparative example 1 was cured for 3 hours at 250° C. in an oxygen atmosphere to yield a PPS (3). The melt viscosity of the obtained PPS (3) was 1800 poise.

Next, 5.98 kg of the resulting PPS (3) and 0.02 kg of polyethylene "Nipolon Hard 8300A (by Tosoh)" were mixed uniformly beforehand in a tumbler. Thereafter, melt kneading was carried out in a biaxial extruder "TEM-35B" at a cylinder temperature of 300° C., under supply of glass fibers having an average fiber diameter of 9 μm and a fiber length of 3 mm "RES03-TP91" through a side feeder, to an addition amount of 40 wt %. A pelletized PPS composition (2) was obtained as a result. The obtained PPS composition (2) was dried for 5 hours at 175° C.

Preparative Example 3

Preparation of PPS Composition (3)

Herein, 7.2 kg of the PPS (2) obtained in Preparative example 1 and 0.8 kg of a glycidyl methacrylate-ethylene copolymer "Bondfast E (by Sumitomo Chemical)" were mixed uniformly beforehand in a tumbler. Thereafter, melt kneading was carried out in a biaxial extruder "TEM-35B" at a cylinder temperature of 300° C., under supply of glass fibers having an average fiber diameter of 9 μm and a fiber length of 3 mm "RES03-TP91" through a side feeder, to an addition amount of 20 wt %. A pelletized PPS composition (3) was obtained as a result. The obtained PPS composition (3) was dried for 5 hours at 175° C.

Preparative Example 4

Preparation of PPS Composition (4)

Herein, 4.0 kg of the PPS (2) obtained in Preparative example 1 and 4.0 kg of an ethylene-acrylic ester-maleic anhydride terpolymer "Bondine TX8030" were mixed uniformly beforehand in a tumbler. Thereafter, melt kneading was carried out in a biaxial extruder "TEM-35B" at a cylinder temperature of 300° C., under supply of glass fibers having an average fiber diameter of 9 μm and a fiber length of 3 mm "RES03-TP91" through a side feeder, to an addition amount of 20 wt %. A pelletized PPS composition (4) was obtained as a result. The obtained PPS composition (4) was dried for 5 hours at 175° C.

Preparative Example 5

Preparation of PBT Composition (1)

Herein, 4.5 kg of a PBT resin "Toraycon 1100S (by Toray)" and 0.5 kg of a PET resin "TR-4550BH (by Teijin Kasei)" were mixed uniformly beforehand in a tumbler. Thereafter, melt kneading was carried out in a biaxial extruder "TEM-35B" at a cylinder temperature of 270° C., under supply of glass fibers having an average fiber diameter of 9 μm and a fiber length of 3 mm "RES03-TP91" through a side feeder, to an addition amount of 30 wt %. A pelletized PBT resin composition was obtained as a result. The obtained PBT composition (1) was dried for 3 hours at 140° C.

Preparative Example 6

Preparation of PBT Composition (2)

Herein, 6.0 kg of PBT resin "Toraycon 1401×31 (by Toray), 0.7 kg of an ethylene-acrylic ester-maleic anhydride terpolymer "Bondine TX8030" and 0.15 kg of epoxy resin "Epikote 1004" were mixed uniformly beforehand in a tumbler. Thereafter, melt kneading was carried out in a biaxial extruder "TEM-35B" at a cylinder temperature of 270° C., under supply of glass fibers having an average fiber diameter of 9 μm and a fiber length of 3 mm "RES03-TP91" through a side feeder, to an addition amount of 30 wt %. A pelletized PBT composition (2) was obtained as a result. The obtained PBT composition (2) was dried for 5 hours at 150° C.

Preparative Example 7

Preparation of PBT Composition (3)

Herein, 6.0 kg of a PBT resin "Toraycon 1401×31", 0.5 kg of a PET resin "TR-4550BH", 0.5 kg of an ethylene-acrylic ester-maleic anhydride terpolymer "Bondine TX8030" and 0.1 kg of epoxy resin "Epikote 1004" were mixed uniformly beforehand in a tumbler. Thereafter, melt kneading was carried out in a biaxial extruder "TEM-35B" at a cylinder temperature of 270° C., under supply of glass fibers having an average fiber diameter of 9 μm and a fiber length of 3 mm "RES03-TP91" through a side feeder, to an addition amount of 30 wt %. A pelletized PBT composition (3) was obtained as a result. The obtained PBT composition (3) was dried for 5 hours at 150° C.

Experimental Example 1

Preparation of a Galvanized Steel Sheet Piece

A 0.4 mm-thick oiled and chromate-treated hot-dip galvanized steel sheet "Z18 (by Nippon Steel & Sumikin Metal Products)" was procured, and was cut into multiple 18 mm×45 mm rectangular galvanized steel sheet pieces. An aqueous solution at a liquid temperature of 75° C. containing 7.5% of a commercially available degreasing agent for aluminum alloys "NE-6 (by Meltex)" was prepared in a bath, to yield a degreasing aqueous solution. Then, 5 galvanized steel sheet pieces were immersed for 7 minutes in this degreasing bath, were then thoroughly rinsed with deionized water, and were dried at 90° C. for 15 minutes in a hot-air dryer.

Two days later, one of the pieces was cut and observed under a scanning probe microscope. When scanned 6 times over a length of 20 μm, the pieces exhibited a peak-valley average spacing RSm of 0.8 to 1.8 μm and a maximum height roughness Rz of 0.3 to 0.9 μm. The measurement results for 20 scannings yielded an RSm of 0.8 to 2.3 μm and a maximum height roughness Rz of 0.3 to 1.0 μm. Electron microscopy revealed that the surface of the galvanized steel sheet pieces was covered with innumerable clean-cut convex protrusions having a diameter of about 100 nm. It was found that the chromate treatment layer on the hot-dip galvanized steel sheet that was used was exposed through the oil-removing action of the degreasing step, or that organic matter or polymer components comprised in the chromate treatment had sloughed off. That is, the surface of the galvanized steel sheet pieces satisfies the first to third conditions of "new NMT" and "NAT" as a result of the degreasing treatment alone. This surface treatment method, moreover, requires no surface hardening treatment, no chemical etching treatment and no fine etching treatment, and can hence contribute to shortening the duration, and lowering the cost, of the composite manufacturing process.

Experimental Example 2

Preparation of a Galvanized Steel Sheet Piece: Comparative Example

A plurality of galvanized steel sheet pieces was prepared by cutting a hot-dip galvanized steel sheet "Z18", the same as used in Experimental example 1, into 18 mm×45 mm rectangular pieces, An aqueous solution at a liquid temperature of 50° C., lower than that of Experimental example 1, and containing 7.5% of a degreasing agent for aluminum alloys "NE-6" was prepared in a bath, to yield a degreasing aqueous solution. The galvanized steel sheet pieces were immersed for 2 minutes in the degreasing bath, were thoroughly rinsed with water, and were dried in a hot-air dryer at 90° C. for 15 minutes.

Figure 13:
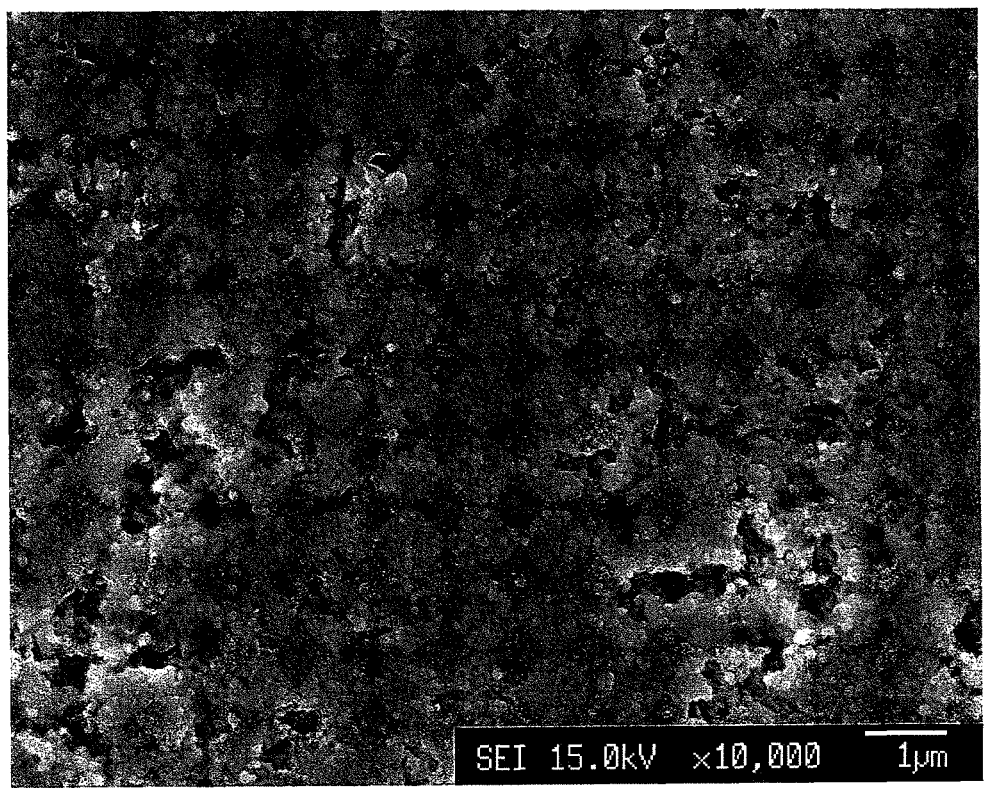
FIG. 13 is an electron micrograph (10,000 magnifications) of a commercially-available hot-dip galvanized steel sheet "Z-18" after being subjected to a light degreasing treatment.
Figure 14:
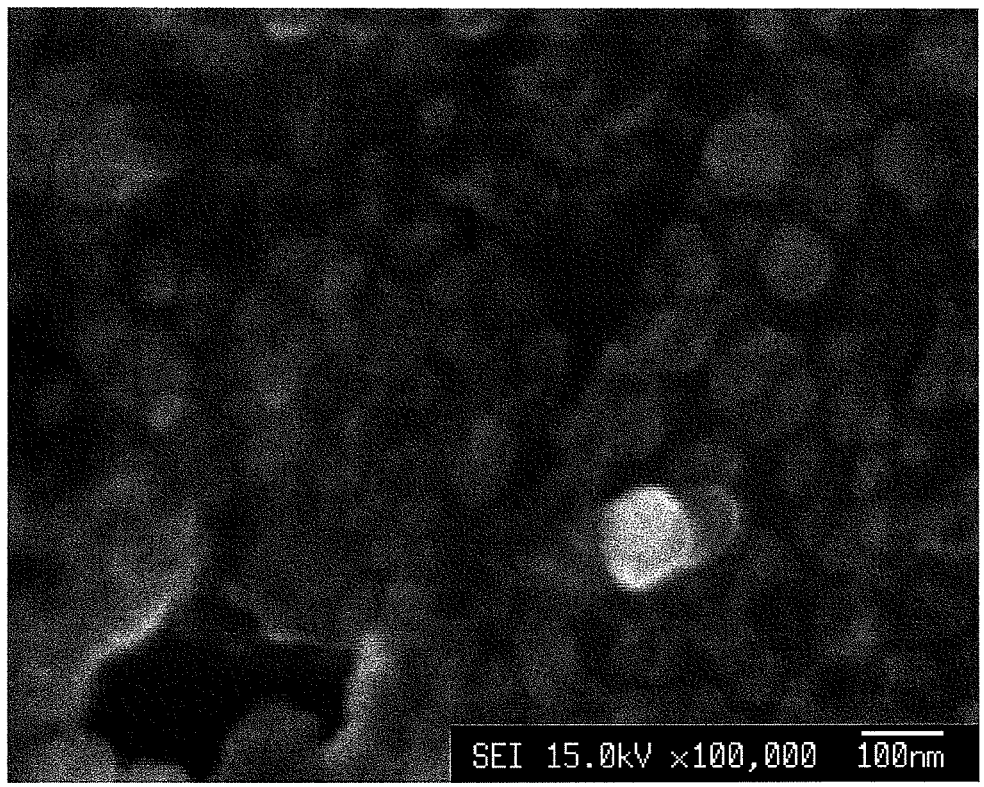
FIG. 14 is an electron micrograph (100,000 magnifications) of a commercially-available hot-dip galvanized steel sheet "Z-18" after being subjected to a light degreasing treatment.

FIG. 13 and FIG. 14 illustrate the observation results of the obtained galvanized steel sheet pieces in an electron microscope at 10,000 magnifications and 100,000 magnifications. FIG. 13 shows extremely shallow irregularities, in the form of protrusion groups having a diameter of about 100 nm that can be seen through fissures, within a substantially flat greater area. In FIG. 14, the flat area is viewed at 100,000 magnifications. What is seen within the shallow irregularities were believed to be protrusion groups, having a diameter of about 100 nm, standing immediately below the flat surface (electron beams from the electron microscope traverse the top layer and are reflected by hard matter disposed immediately below). The surface of Experimental example 1 resulted from stripping the top layer and enlarging the fissure portions observable in FIG. 13. That is, the micrographs showed that the above surface does not have a micron-scale roughness according to the first condition.

Experimental Example 3

Preparation of a Galvanized Steel Sheet Piece

A plurality of galvanized steel sheet pieces were prepared by cutting a hot-dip galvanized steel sheet "Z18", the same as used in Experimental example 1, into 18 mm×45 mm rectangular pieces. An aqueous solution at a liquid temperature of 75° C. containing 7.5% of a degreasing agent for aluminum alloys "NE-6" was prepared in a bath, to yield a degreasing aqueous solution. In a separate dipping bath there was prepared a zinc phosphate conversion treatment solution at 55° C. containing 1.2% of orthophosphoric acid, 0.21% of zinc oxide, 0.16% of sodium fluorosilicate and 0.23% of basic nickel carbonate.

The galvanized steel sheet pieces were first immersed for 5 minutes in the degreasing bath and were then rinsed with water. The pieces were immersed in the conversion treatment bath for 1 minute, and were rinsed with water. The pieces were dried at 90° C. for 15 minutes. In this experiment fine hydrogen bubbles were observed during immersion in the conversion treatment bath. This indicated that zinc was dissolved and ionized through the acidity of phosphoric acid. The conversion treatment doubles thus herein as both a "chemical etching" and a "surface hardening" (the purposes intended originally by the inventors for the conversion treatment).

Figure 15:
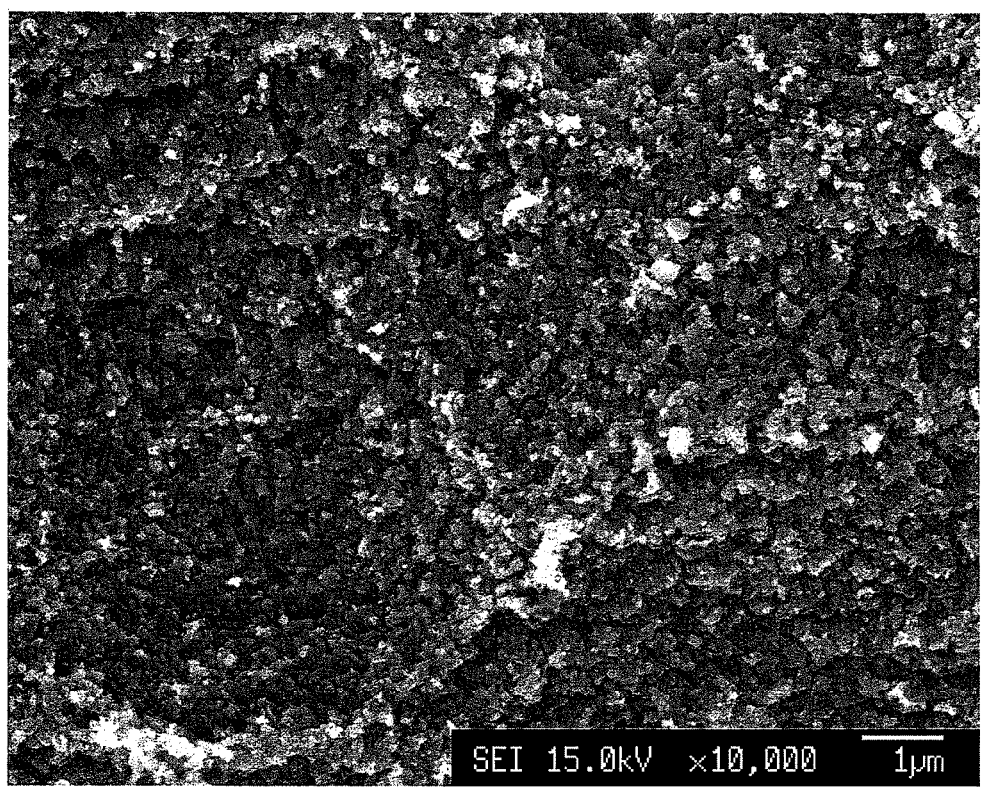
FIG. 15 is an electron micrograph (10,000 magnifications) of a commercially-available hot-dip galvanized steel sheet "Z-18" after being immersed in a zinc phosphate conversion treatment solution.
Figure 16:
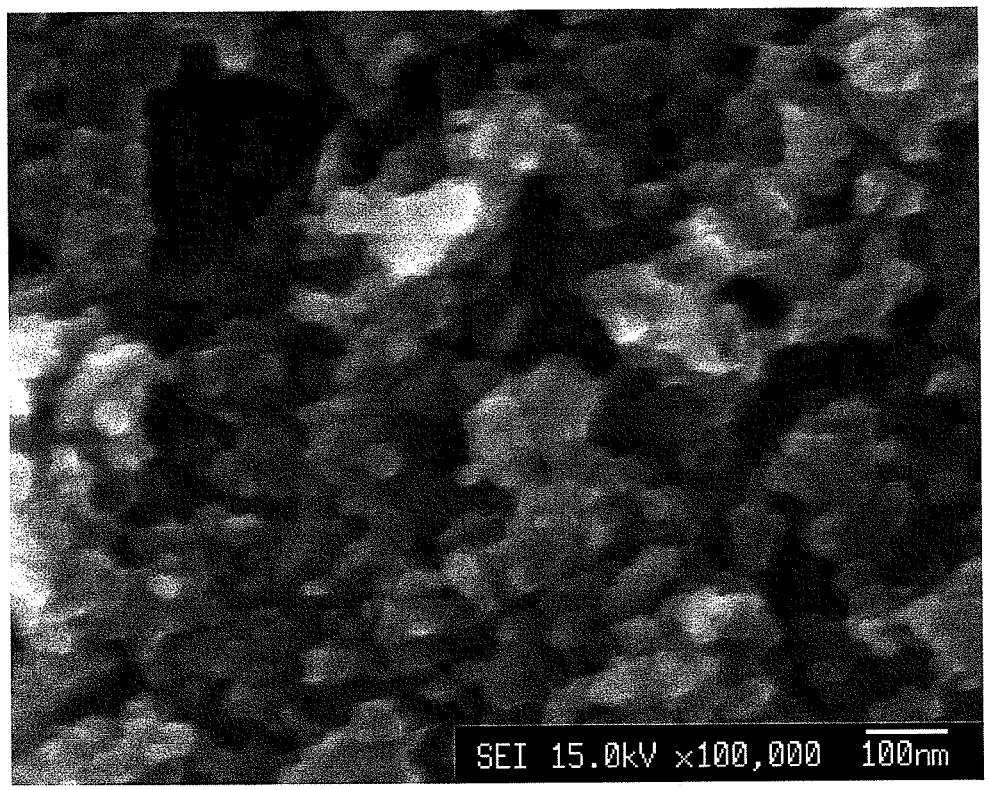
FIG. 16 is an electron micrograph (100,000 magnifications) of a commercially-available hot-dip galvanized steel sheet "Z-18" after being immersed in a zinc phosphate conversion treatment solution.

Two days later, one of the pieces was cut and observed under an electron microscope and a scanning probe microscope. FIG. 15 and FIG. 16 illustrate electron microscopy results at 10,000 magnifications and 100,000 magnifications. FIG. 16 shows that the entire surface was covered with ultra-fine irregularities in the form of protrusions of irregular polyhedral shapes, having a diameter of 20 to 150 nm (average diameter about 50 nm) stacked on one another. The results of a measurement involving 10 scannings over a length of 20 µm using a scanning probe microscope revealed a peak-valley average spacing RSm of 1.5 to 2.3 µm and a maximum height roughness Rz of 0.5 to 1.5 µm. The results of electron microscopy showed that there is obtained the ultrafine irregular surface that is demanded by "new NMT" and by "NAT", and that "chemical etching", "fine etching" and "surface hardening" are achieved simultaneously. This surface treatment method satisfies the first through third conditions, and hence requires no separate chemical etching treatment or fine etching treatment. Therefore, the surface treatment method contributes to shortening the duration, and lowering the cost, of the composite manufacturing process.

Experimental Example 4

Preparation of Galvanized Steel Sheet Pieces

A plurality of galvanized steel sheet pieces were prepared by cutting a hot-dip galvanized steel sheet "Z18", the same as used in Experimental example 1, into 18 mm×45 mm rectangular pieces. An aqueous solution at a liquid temperature of 75° C. containing 7.5% of a commercially available degreasing agent for aluminum alloys "NE-6" was prepared in a bath, to yield a degreasing aqueous solution. In a separate bath there was prepared a zinc calcium phosphate-type conversion treatment solution at 65° C., and containing 1.2% of orthophosphoric acid, 0.2% of zinc nitrate, 0.3% of calcium nitrate and 0.2% of basic nickel carbonate.

The galvanized steel sheet pieces were first immersed for 5 minutes in the degreasing bath and were then rinsed with water. The pieces were immersed in the conversion treatment bath for 1 minute, and were rinsed with water. The pieces were dried at 90° C. for 15 minutes. Fine hydrogen bubbles were observed to form in the conversion treatment bath. This indicated that the galvanization layer was dissolved and ionized through the acidity of phosphoric acid. The conversion treatment doubles thus herein as both "chemical etching" and "surface hardening" (the purpose intended by the inventors for the conversion treatment). The results of a measurement involving 6 scannings over a length of 20 µm using a scanning probe microscope revealed a peak-valley average spacing RSm of 2.5 to 4 µm and a maximum height roughness Rz of 0.3 to 0.8 µm.

Experimental Example 5

Preparation of Galvanized Steel Sheet Pieces

An experiment identical to Experimental example 4 was performed. Herein, however, there was used a commercially-available zinc calcium phosphate conversion treatment solution instead of the zinc calcium phosphate conversion treatment solution prepared from scratch that was used in Experimental example 4. In the present Experimental example 5 there was used "Palbond 880 (by Nihon Parkerizing)". The ordinary use conditions of "Palbond 880" (use conditions during the conversion treatment of the steel material) involve a liquid temperature of 80 to 90° C., and immersion of the steel material for about 2 minutes. In the present invention, by contrast, the conditions were significant milder. Specifically, immersion lasted for 1 minute at a liquid temperature of 65° C.

Figure 17:
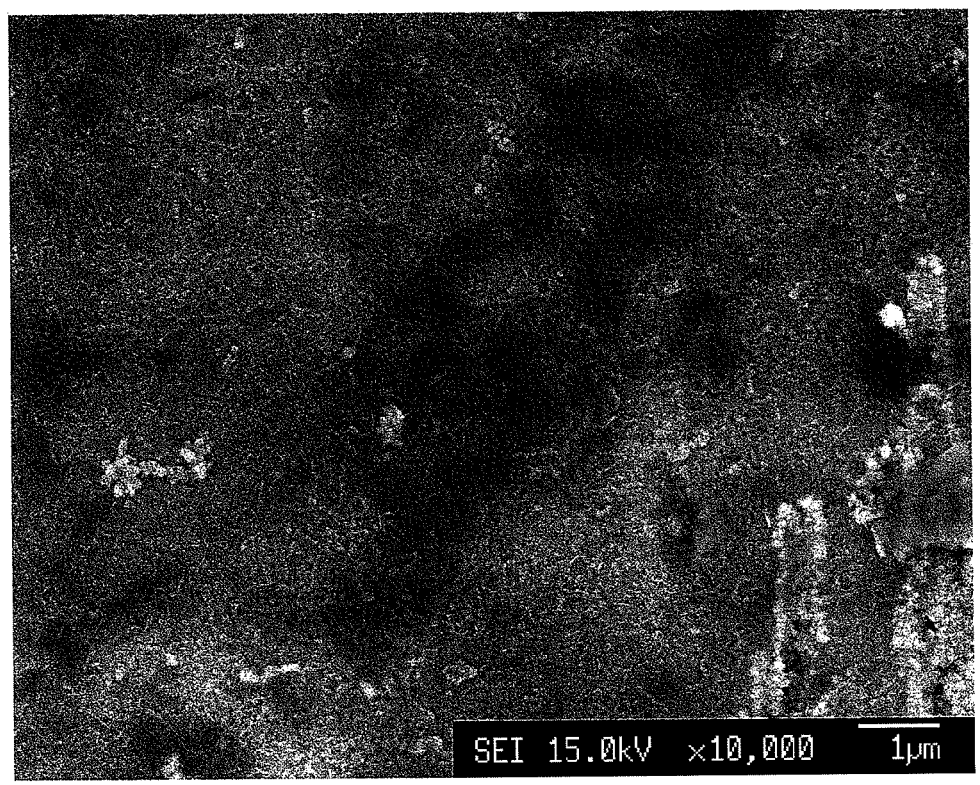
FIG. 17 is an electron micrograph (10,000 magnifications) of a commercially-available hot-dip galvanized steel sheet "Z-18" after being immersed in a zinc calcium phosphate conversion treatment solution.
Figure 18:
FIG. 18 is an electron micrograph (100,000 magnifications) of a commercially-available hot-dip galvanized steel sheet "Z-18" after being immersed in a zinc calcium phosphate conversion treatment solution.

A galvanized steel sheet piece subjected to the above surface treatment was observed under an electron microscope and a scanning probe microscope. FIG. 17 and FIG. 18 illustrate electron microscopy results at 10,000 magnifications and 100,000 magnifications. The micrographs show a surface entirely covered with piles of irregular polyhedral plates having a long-short diameters of 80 to 200 nm. Measurements under the scanning probe microscope revealed a rough surface having an average texture period RSm of 2.8 to 3.6 μm and a maximum height roughness Rz of 0.4 to 1.3 μm. This surface treatment method satisfies the first to third conditions, and hence requires no separate chemical etching treatment or fine etching treatment. Therefore, the surface treatment method contributes to shortening the duration, and lowering the cost, of the composite manufacturing process.

Experimental Example 6

Preparation of Galvanized Steel Sheet Pieces

An experiment identical to Experimental example 3 was performed. Herein, however, there was used a different chromate treatment aqueous solution at 40° C., namely containing 1.2% of chromium nitrate hydrate, 0.3% of chromium trioxide, 1.5% of orthophosphoric acid, and 0.033% of basic nickel carbonate, instead of the zinc phosphate conversion treatment used in Example 3.

A treatment solution of such a system, developed to be comparatively closest to treatment solutions used in ordinary steel materials (iron alloys), contains characteristically trivalent chromium and hexavalent chromium, and is an excellent conversion treatment solution for chromate treatment of steel materials. The galvanized steel sheet piece was degreased, rinsed with water and subjected to a conversion treatment in the same way as in Experimental examples 3, 4 and 5. The solution had a strong coloration, and hence the presence or absence of bubbles could not be assessed. After the conversion treatment, the pieces were thoroughly rinsed with deionized water, and were dried for 15 minutes at 90° C.

Figure 19:
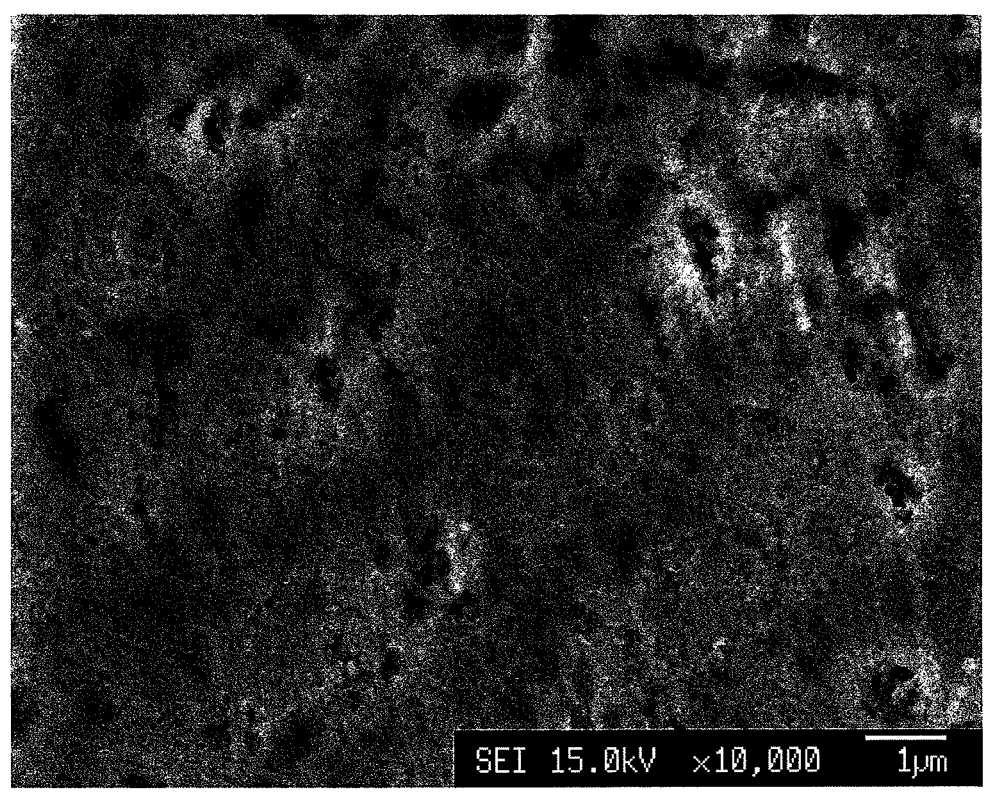
FIG. 19 is an electron micrograph (10,000 magnifications) of a commercially-available hot-dip galvanized steel sheet "Z-18" after being immersed in a conversion treatment solution for steel materials comprising trivalent chromium and hexavalent chromium.
Figure 20:
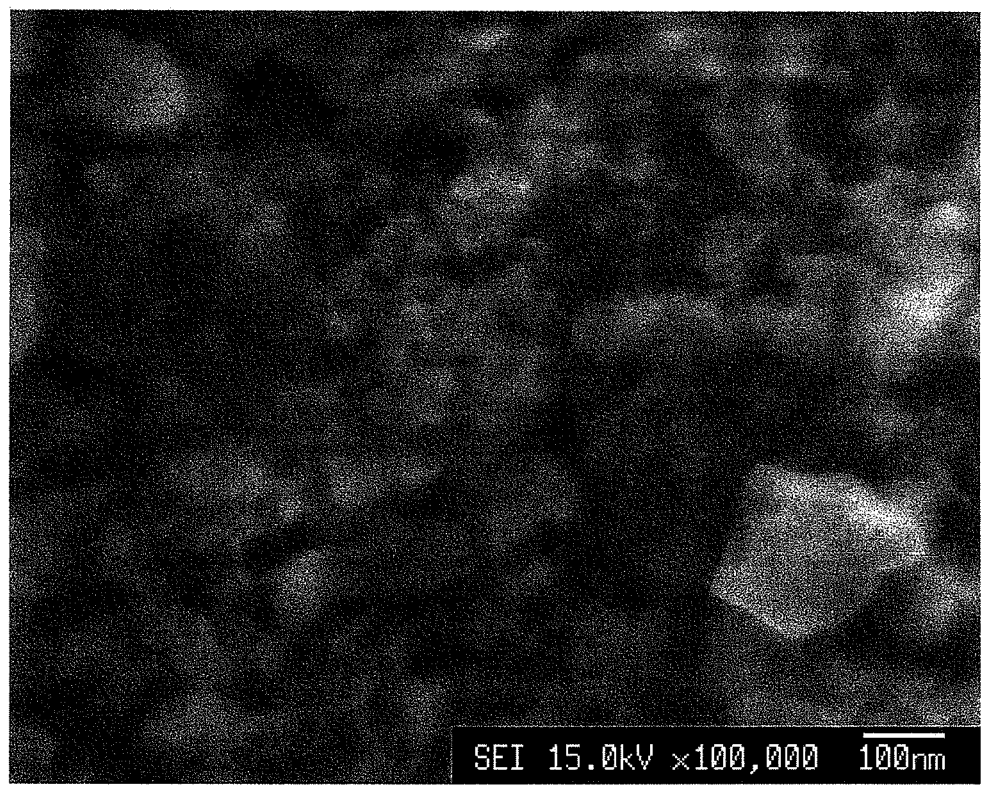
FIG. 20 is an electron micrograph (100,000 magnifications) of a commercially-available hot-dip galvanized steel sheet "Z-18" after being immersed in a conversion treatment solution for steel materials comprising trivalent chromium and hexavalent chromium.

The galvanized steel sheet piece thus treated was observed under an electron microscope and a scanning probe microscope. FIG. 19 and FIG. 20 illustrate electron microscopy results at 10,000 magnifications and 100,000 magnifications. The figures show a surface entirely covered with ultra-fine irregularities of indefinite period of 10 to 200 nm. Measurements using a scanning probe microscope revealed a rough surface having a peak-valley average spacing RSm of 1.3 to 2.5 μm and a maximum height roughness Rz of 0.3 to 1.5 μm.

Experimental Example 7

Preparation of Galvalume Steel Sheet Pieces

A 0.6 mm-thick hot-dip zinc-aluminum alloy coated steel sheet (commonly referred to as galvalume steel sheet) "GL-AZ150 (by Nisshin Steel)" was cut into 18 mm×45 mm rectangular pieces, to prepare a plurality of zinc-aluminum alloy coated steel sheet pieces. An aqueous solution at a liquid temperature of 60° C. containing 7.5% of a commercially available degreasing agent for aluminum "NE-6" was prepared in a bath, to yield a degreasing aqueous solution. In a separate bath there was prepared a 1.5% aqueous solution of caustic soda at 40° C., as an aqueous solution for preliminary basic washing. Also, an aqueous solution containing 5% sulfuric acid at 50° C. was prepared as an etching solution. In another separate bath there was prepared 1% aqueous ammonia at 25° C., for neutralization. In yet another separate bath there was prepared a zinc phosphate conversion treatment solution at 55° C. containing 1.5% of 80% orthophosphoric acid, 0.21% of zinc oxide, 0.16% of sodium fluorosilicate and 0.23% of basic nickel carbonate. The zinc-aluminum alloy coated steel sheet pieces were first immersed in the degreasing bath for 5 minutes, and were rinsed with water. Next, the pieces were immersed for 1 minute in the preliminary basic washing bath, and were rinsed with water. The pieces were immersed next in the etching bath for 1 minute, and were rinsed with water. Next, the pieces were immersed in the neutralization bath for 1 minute, and were rinsed with water. The pieces were immersed next in the conversion treatment layer for 1 minute, and were rinsed with water. Thereafter, the pieces were dried at 90° C. for 15 minutes, to complete the surface treatment.

Figure 21:
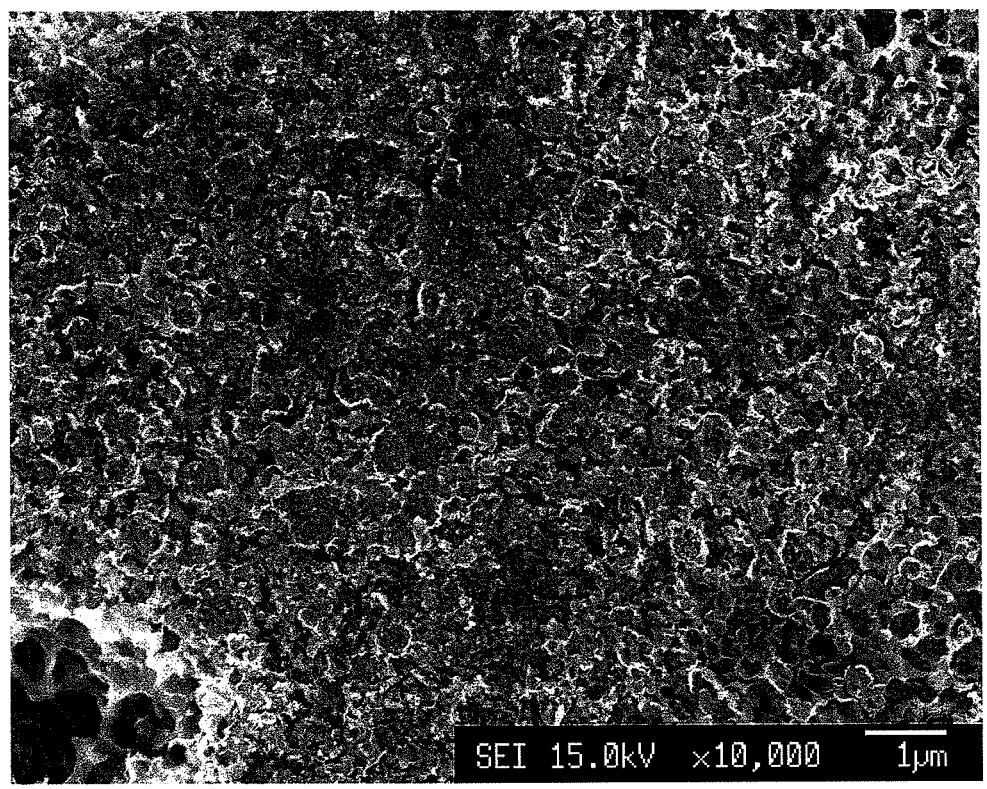
FIG. 21 is an electron micrograph (10,000 magnifications) of a commercially-available hot-dip zinc-aluminum alloy coated steel sheet "GLAZ-150" after being etched in dilute sulfuric acid and subjected to a zinc phosphate conversion treatment.
Figure 22:
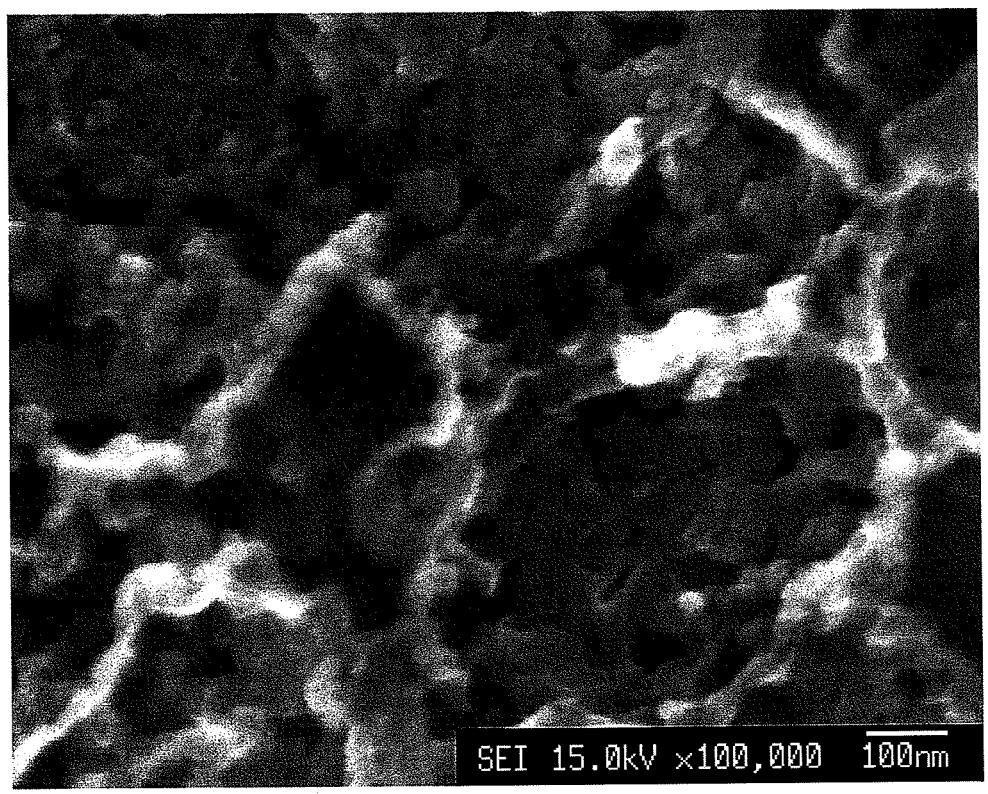
FIG. 22 is an electron micrograph (100,000 magnifications) of a commercially-available hot-dip zinc-aluminum alloy coated steel sheet "GLAZ-150" after being etched in dilute sulfuric acid and subjected to a zinc phosphate conversion treatment.

Two days later, one of the pieces was cut and observed under an electron microscope and a scanning probe microscope. FIG. 21 and FIG. 22 illustrate electron microscopy results at 10,000 magnifications and 100,000 magnifications. The figures show that the surface is entirely covered with ultra-fine irregularities in the form of clustered protrusions, of varying height and having a diameter of 30 to 300 nm, in which the ends of irregular polyhedral rods, having a diameter of 30 to 50 nm, come into contact with one another. Described alternatively, the surface is entirely covered with ultra-fine irregularities in the form of irregular polyhedral protrusions, having a diameter of 20 to 300 nm, heaped onto one another. Measurements under the scanning probe microscope revealed a rough surface having an average texture period RSm of 2.8 to 3.8 μm and a maximum height roughness Rz of 1.1 to 1.8 μm.

Figure 23:
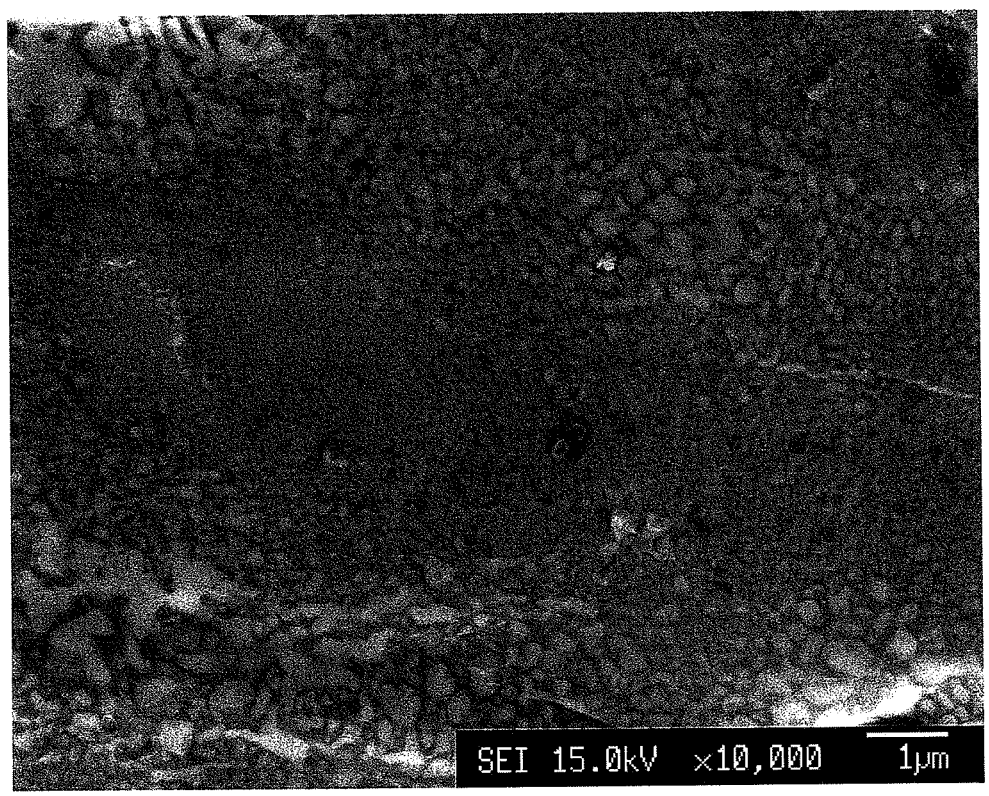
FIG. 23 is an electron micrograph (10,000 magnifications) of a commercially-available hot-dip zinc-aluminum alloy coated steel sheet "GLAZ-150" after being subjected to a degreasing treatment.
Figure 24:
FIG. 24 is an electron micrograph (100,000 magnifications) of a commercially-available hot-dip zinc-aluminum alloy coated steel sheet "GLAZ-150" after being subjected to a degreasing treatment.

For verification, steel sheet pieces of a hot-dip zinc-aluminum alloy coated steel sheet "GL-AZ150" not having undergone the above-described surface treatment were dipped for 5 minutes in the above-described degreasing bath, were rinsed with water and were dried, whereupon micrographs thereof were taken at 10,000 magnifications and 100,000 magnifications. The results are illustrated in FIG. 23 and FIG. 24. The micrographs show a surface virtually devoid of ultra-fine irregularities. This absence of irregularities implied that the steel sheet had not been subjected to a chromate treatment, a zinc phosphate conversion treatment or a zinc calcium phosphate conversion treatment.

Experimental Example 8

Injection Bonding

The surface-treated galvanized steel sheet pieces in Experimental example 6 were taken out, were picked up using gloves, to prevent adhesion of grease or the like, and were inserted into an injection mold. The mold was closed and the PPS composition (1) obtained in Preparative example 1 was injected at an injection temperature of 310° C. The mold temperature was 140° C. This injection bonding yielded 20 integrated composites 7 illustrated in FIG. 2. The size of the resin portion was 10 mm×45 mm×5 mm. The adhesion area was 10 mm×5 mm=0.5 cm$^2$. Annealing was performed on the same day of molding, in a hot-air dryer at 170° C. for 1 hour. One day later, the composites were tested in a tensile tester, which yielded an average shear rupture strength of 21.8 MPa.

Experimental Example 9

Injection Bonding: Comparative Example

An experiment was conducted in the same way as in Experimental example 8, but using herein the PPS composition (2) obtained in Preparative example 2 instead of the PPS composition (1) obtained in Preparative example 1.

Composites were obtained through injection bonding using the surface-treated galvanized steel sheet pieces of Experimental example 6. The obtained composites were annealed at 170° C. for 1 hour. In the experiment there was used a PPS resin composition comprising only a filler and PPS containing only a very small amount of polyolefin polymer. One day later, 10 of the composites were subjected to a tensile test. The average shear rupture strength was 7.5 MPa. The difference in the materials of the resin composition that was used accounted for the considerably poorer results as compared with those of Experimental example 8.

Experimental Example 10

Injection Bonding

An experiment was conducted in the same way as in Experimental example 8, but using herein the PPS composition (3) obtained in Preparative example 3 instead of the PPS composition (1) obtained in Preparative example 1. Composites were obtained through injection bonding using the surface-treated galvanized steel sheet pieces of Experimental example 6. The obtained composites were annealed for 1 hour at 170° C. on the day of molding. Two days later, the shear rupture strength of the composites was measured in a tensile tester, which yielded an average of 20.0 MPa.

Experimental Example 11

Injection Bonding: Comparative Example

An experiment was conducted in the same way as in Experimental example 8, but using herein the PPS composition (4) obtained in Preparative example 4 instead of the PPS composition (1) obtained in Preparative example 1. Composites were obtained through injection bonding using the surface-treated galvanized steel sheet pieces of Experimental example 6. In the experiment there was used a PPS resin composition containing a substantial amount of polyolefin polymer. However, a large amount of gas was generated during molding, and thus molding was discontinued. The main component of the resin composition in this experiment was not PPS.

Experimental Example 12

Injection Bonding

Injection bonding was carried out using the PBT composition (1) obtained in Preparative example 5 and the surface-treated galvanized steel sheet pieces from Experimental example 6. Specifically, the galvanized steel sheet pieces were inserted in an injection mold. The mold was closed and the PBT composition (1) obtained in Preparative example 5 was injected at an injection temperature of 280° C. The mold temperature was 140° C. The above injection bonding yielded 20 composites illustrated in FIG. 2. The size of the resin portion was 10 mm×45 mm×5 mm. The adhesion area was 10 mm×5 mm=0.5 cm$^2$. The composites were annealed on the same day of molding, in a hot-air dryer at 150° C. for 1 hour. One day later, the composites were tested in a tensile tester, which yielded a three-piece average shear rupture strength of 19.0 MPa.

Experimental Example 13

Injection Bonding: Comparative Example

Composites were obtained by injection bonding in exactly the same way as in Experimental example 12, but using herein a commercially available PBT resin "Toraycon 1101G30 (by Toray)", containing 30% of glass fibers, instead of the PBT composition (1) obtained in Preparative example 5. The obtained composites were annealed at 150° C. for 1 hour. In the present example there is used a PBT resin composition comprising only a filler plus PBT containing no polymer that elicits injection bonding. One day later the composites were tested using a tensile tester to measure shear rupture strength. The resulting average shear rupture strength was low, of 9.2 MPa, significantly inferior to that of Experimental example 12.

Experimental Example 14

Injection Bonding

Composites were obtained by injection bonding in exactly the same way as in Experimental example 12, but using herein the PBT composition (2) obtained in Preparative example 6 instead of the PBT composition (1) obtained in Preparative example 5. The obtained composites were annealed on the same day of molding at 150° C. for 1 hour. Two days later, the composites were tested using a tensile tester to measure shear rupture strength, which averaged 18.7 MPa.

Experimental Example 15

Injection Bonding

Composites were obtained by injection bonding in exactly the same way as in Experimental example 12, but using herein the PBT composition (3) obtained in Preparative example 7 instead of the PBT composition (1) obtained in Preparative example 5. The obtained composites were annealed on the same day of molding at 150° C. for 1 hour. Two days later, the composites were tested using a tensile tester to measure shear rupture strength, which averaged 18.1 MPa.

Experimental Example 16

Injection Bonding: Comparative Example

The surface-treated galvanized steel sheet pieces in Experimental example 2 were taken out, were picked up using gloves, to prevent adhesion of grease or the like, and were inserted into an injection mold. The mold was closed and the PPS composition (1) obtained in Preparative example 1 was injected at an injection temperature of 310° C. The mold temperature was 140° C. Specifically, injection bonding was carried out in exactly the same way as in Experimental example 8, but herein the used galvanized steel sheet pieces were surface-treated as in Experimental example 2, and not as in Experimental example 6. The composites obtained in above injection bonding were annealed for 1 hour in a hot-air dryer at 170° C. One day later the composites were tested using a tensile tester to measure shear rupture strength. The resulting average shear rupture strength was a mere 9.8 MPa, significantly inferior to that of Experimental example 8.

Experimental Example 17

Injection Bonding

The PPS composition (1) was injection-bonded in exactly the same way as in Experimental example 8, but using herein the surface-treated galvanized steel sheet pieces of Experimental example 1 instead of the surface-treated galvanized steel sheet pieces of Experimental example 6. The composites obtained through the above injection bonding were annealed in a hot-air dryer at 170° C. for 1 hour. One day later, the composites were tested in a tensile tester, which yielded an average shear rupture strength of 18.8 MPa.

Experimental Example 18

Injection Bonding

The PPS composition (1) was injection-bonded in exactly the same way as in Experimental example 8, but using herein the surface-treated galvanized steel sheet pieces of Experimental example 3 instead of the surface-treated galvanized steel sheet pieces of Experimental example 6. The composites obtained through the above injection bonding were annealed in a hot-air dryer at 170° C. for 1 hour. One day later, the composites were tested in a tensile tester, which yielded a three-piece average shear rupture strength of 22.5 MPa.

Experimental Example 19

Injection Bonding

The PPS composition (1) was injection-bonded in exactly the same way as in Experimental example 8, but using herein the surface-treated galvanized steel sheet pieces of Experimental example 4 instead of the surface-treated galvanized steel sheet pieces of Experimental example 6. The composites obtained through the above injection bonding were annealed in a hot-air dryer at 170° C. for 1 hour. One day later, the composites were tested in a tensile tester, which yielded an average shear rupture strength of 21.5 MPa.

Experimental Example 20

Injection Bonding

The PPS composition (1) was injection-bonded in exactly the same way as in Experimental example 8, but using herein the surface-treated galvanized steel sheet pieces of Experimental example 5 instead of the surface-treated galvanized steel sheet pieces of Experimental example 6. The composites obtained through the above injection bonding were annealed in a hot-air dryer at 170° C. for 1 hour. One day later, the composites were tested in a tensile tester, which yielded an average shear rupture strength of 19.5 MPa.

Experimental Example 21

Injection Bonding

The PPS composition (1) was injection-bonded in exactly the same way as in Experimental example 8, but using herein the surface-treated zinc-aluminum alloy coated steel sheet pieces of Experimental example 7 instead of the surface-treated galvanized steel sheet pieces of Experimental example 6. The composites obtained through the above injection bonding were annealed in a hot-air dryer at 170° C. for 1 hour. One day later, the composites were tested in a tensile tester, which yielded an average shear rupture strength of 24.8 MPa.

Experimental Example 22

Injection Bonding

The surface-treated zinc-aluminum alloy coated steel sheet pieces in Experimental example 7 were taken out, were picked up using gloves, to prevent adhesion of grease or the like, and were inserted into an injection mold. The mold was closed and the PBT composition (1) obtained in Preparative example 5 was injected at an injection temperature of 280° C. The mold temperature was 140° C. The above injection bonding yielded 20 composites illustrated in FIG. 2. The size of the resin portion was 10 mm×45 mm×5 mm. The adhesion area was 10 mm×5 mm=0.5 cm$^2$. The composites were annealed on the same day of molding, in a hot-air dryer at 150° C. for 1 hour. One day later, the composites were tested in a tensile tester, which yielded an average shear rupture strength of 23.8 MPa.

Experimental Example 23

Injection Bonding: Comparative Example

The hot-dip zinc-aluminum alloy coated steel sheet "GL-AZ150" used in Experimental example 7 was cut into 18 mm×45 mm rectangular pieces to yield a plurality of zinc-aluminum alloy coated steel sheet pieces. The zinc-aluminum alloy coated steel sheet pieces were immersed at 65° C. for 7 minutes in a 7.5% aqueous solution of a degreasing agent for aluminum "NE-6", and were rinsed with water. The PBT composition (1) was injection-bonded in exactly the same way as in Experimental example 20, but using herein zinc-aluminum alloy coated steel sheet pieces subjected to only the degreasing treatment, instead of the surface-treated galvanized steel sheet pieces of Experimental example 5. The composites obtained through the above injection bonding were annealed at 150° C. for 1 hour. One day later, 10 of the composites were subjected to a tensile test, to measure the shear rupture strength. However, seven of the composites broke during the operation of the tensile jig, while the average shear rupture strength of the remaining three composites was extremely low, of 2.1 MPa.

Experimental Example 24

Manufacture of an Injection Molded Article

An injection molded article having the shape illustrated in FIG. 3 and FIG. 4 was manufactured using (five types given in Table 1): 1. a PBT resin containing 30% of glass fibers "Toraycon 1101G30"; 2. the PBT composition (3) having, as main components, the PBT obtained in Preparative example 7, PET and a polyolefin; 3. the PPS composition (1) obtained in Preparative example 1; 4. a 6 nylon resin "B3EG7 (by BASF)" comprising 30% of glass fibers; and 5. an aromatic polyamide resin "Amilan CM3510G30 (by Toray)" comprising 30% of glass fibers. The runner portion (protruding portion extending from the gate to the main body) of the obtained molded article was cut from the base using a nipper, and was subjected to the following experiment.

Experimental Example 25

Press-Fusion Bonding Experiment

An injection molded article 22 prepared in Experimental example 24 was wedged in the heat-insulating material 20 of the jig upper die 19 of the jig system illustrated in FIG. 5. Meanwhile, the 0.4 mm-thick hot-dip galvanized steel sheet used in Experimental example 6 was cut into 40 mm×60 mm pieces, to yield galvanized steel sheet pieces having the shape illustrated in FIG. 6. The galvanized steel sheet pieces were subjected to exactly the same surface treatment as in Experimental example 6. After the surface treatment, the galvanized steel sheet pieces were heated in a hot plate, were clamped with a pin set, and were set in the recess of the heat-insulating material 12 of the jig lower die 11 illustrated in FIG. 5. The vacuum pump 26 was driven, the jig upper die 19 and the jig lower die 11 were pressed together, and the two-way stopcock 28 was opened. The interior is held at about several mmHg for several to 5 seconds, and the bottom of the resin molded article 22 melts, whereupon the four-way stopcock 27 is turned 90 degrees, to thereby revert the interior of the system to normal pressure.

Figure 8:
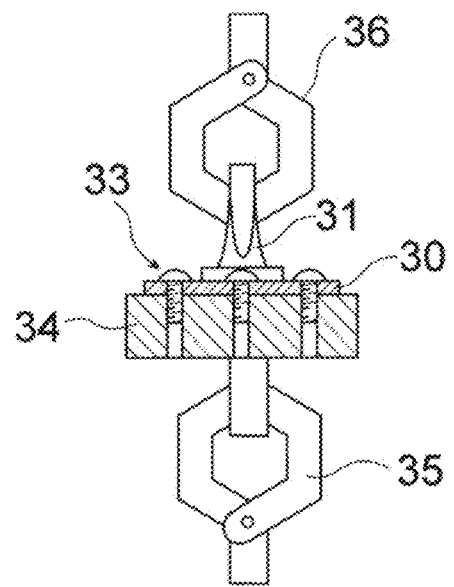
FIG. 8 is a schematic diagram of an apparatus for measuring the breaking strength of a composite obtained by press-fusion bonding.
Figure 25:
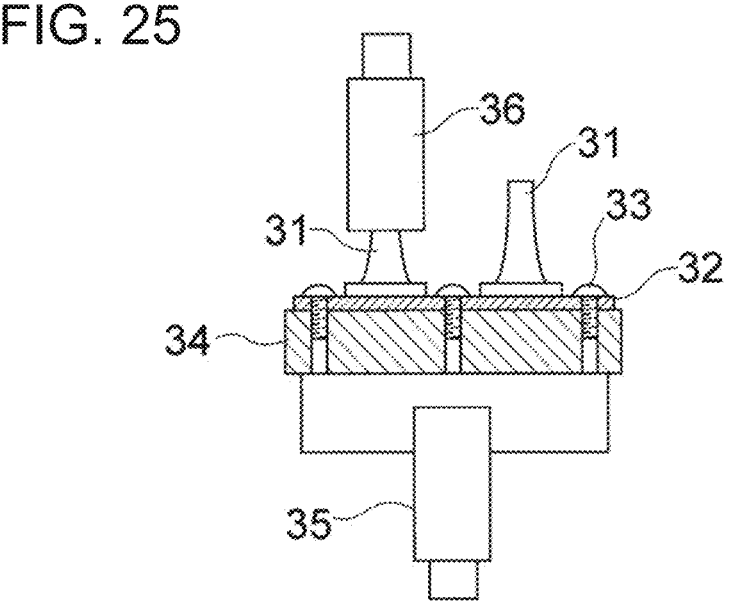
FIG. 25 is another schematic diagram of an apparatus shown in FIG. 8.

It is important to adjust the process in such a manner that the bottom of the resin molded article is kept in a molten state for about ten seconds, depending on the heating temperature and the size (thermal capacity) of the galvanized steel sheet piece. As a result of the above series of operations, the molten resin infiltrates into the micron-scale recesses of the metal alloy surface, and part of the molten resin gets into the ultra-fine irregularities. This gives rise to strong bonding thereafter through crystallization and solidification. The composite illustrated in FIG. 7 is obtained as a result. The composite was annealed in a hot-air dryer at 150° C. for 1 hour, and was then cooled. After 1 week, the resin molded article 31 was gripped by the chucks 36 of a tensile tester, as illustrated in FIG. 8 and FIG. 25. With the galvanized steel sheet piece in a fixed state, the resin molded article 31 was pulled (through application of a pulling external force) until breakage. The force upon breakage was measured. The results obtained in experiments carried out with respective resin molded articles are given in Table 1 ("Experimental example 25"). The specimens that broke at 30 kgF or less were rated as poor (x), while the specimens that did not break were rated as good (◯). None of the above-described five types of resin molded article broke at 30 kgF or less. Therefore, the press-fusion bonding method according to the present invention is found to elicit strong bonding between a galvanized steel sheet and a resin molded article.

Experimental Example 26

Press-Fusion Bonding Experiment: Comparative Example

Herein, the 0.4 mm-thick hot-dip galvanized steel sheet used in Experimental example 6 was cut into 40 mm×60 mm pieces, to yield galvanized steel sheet pieces having the shape illustrated in FIG. 6. The galvanized steel sheet pieces were subjected to exactly the same surface treatment as in Experimental example 2. In this case, however, only light degreasing was carried out. A press-fusion bonding test identical to that of Experimental example 25 was carried out using galvanized steel sheet pieces after the surface treatment. The results are given in Table 1 ("Experimental example 26"). As might have been expected, the galvanized steel sheet piece and the resin molded article did not bond, or the bonding strength was very low, and the five types broke at 30 kgF or less.

TABLE 1

Results of press-fusion bonding experiments on galvanized steel sheets

| Resin type | Heating temperature | Experimental example 25 | Experimental example 26 |
|---|---|---|---|
| PBT Toraycon "1101G30" | 300° C. | ◯ | x |
| PBT/PET/polyolefin | 300° C. | ◯ | x |
| PPS/polyolefin/compatibilizer | 330° C. | ◯ | x |
| PA6 (B3EG7) | 330° C. | ◯ | x |
| Aromatic polyamide (Amilan CM3501G30) | 300° C. | ◯ | x |

Experimental Example 27

Adhesion

The ends of the surface-treated galvanized steel sheet pieces of Experimental examples 1, 3, 5 and 6 were coated with an epoxy adhesive "EP 106 (by Cemedine)", and were placed in a desiccator. The desiccator was depressurized to an inner pressure of 3 mmHg using a vacuum pump. The pressure was reverted to normal pressure after two minutes in a reduced-pressure state. The operation of reverting to normal pressure after depressurization was carried out a total three times, and then the galvanized steel sheet pieces were removed from the desiccator. The surface-treated galvanized steel sheet pieces were stacked onto each other and were fixed, in the manner illustrated in FIG. 11, with clips. The adhesion area therebetween was 0.6 to 0.7 cm². These fixed assemblies were heated in a hot-air dryer. Specifically, the assembly was kept at 100° C. for 1 hour and then the temperature was raised to 135° C. and was held there for 40 minutes. Thereafter, the temperature was further raised to 165° C. and was held there for 30 minutes. The bonded body obtained after cooling was left to stand for one week, after which the bonded body was tested to failure using a tensile tester, to measure the average shear rupture strength. The results are given in Table 2. In all cases the adhesive strength was extremely high, of about 40 MPa.

Experimental Example 28

Adhesion: Comparative Example

An experiment was carried out in exactly the same way as in Experimental example 27, but using herein the surface-treated galvanized steel sheet pieces of Experimental example 2. The measured shear rupture strength is given in Table 2. The shear rupture strength in the present experimental example was 25 MPa, which is inferior to the adhesive strength in all instances of Experimental example 27. This showed that bonding strength is enhanced when the epoxy adhesive penetrates into the irregularities and ultra-fine irregularities of the micron-scale roughness, and solidifies in that state within the irregularities.

TABLE 2

Joining using an epoxy adhesive "EP 106 (by Cemedine)"

| Experimental example | Surface treatment | Conversion coating type | Average shear rupture strength |
|---|---|---|---|
| Experimental example 27 | Experimental example 1 | Chromate (details unclear) | 39 MPa |
| Experimental example 27 | Experimental example 3 | Zinc phosphate | 38 MPa |
| Experimental example 27 | Experimental example 5 | Zinc calcium phosphate | 37 MPa |
| Experimental example 27 | Experimental example 6 | Chromate | 40 MPa |
| Experimental example 28 | Experimental example 2 | Chromate, but mostly hidden | 25 MPa |

Experimental Example 29

Adhesion

The ends of the surface-treated zinc-aluminum alloy coated steel sheet pieces of Experimental example 7 were coated with an epoxy adhesive "EP 106", and were placed in a desiccator. The desiccator was depressurized to an inner pressure of 3 mmHg using a vacuum pump. The pressure was reverted to normal pressure after two minutes in a reduced-pressure state. The operation of reverting to normal pressure after depressurization was carried out a total three times, and then the zinc-aluminum alloy coated steel sheet pieces were removed from the desiccator. The removed zinc-aluminum alloy coated steel sheet pieces were stacked onto each other and were fixed, in the manner illustrated in FIG. 11, with clips. The adhesion area therebetween was 0.6 to 0.7 cm$^2$. These fixed assemblies were heated in a hot-air dryer. Specifically, the temperature was raised to 135° C. and was held there for 40 minutes. Thereafter, the temperature was further raised to 165° C. and was held there for 30 minutes. The bonded body obtained after cooling was left to stand for one week, after which the bonded body was tested to failure using a tensile tester, to measure the average shear rupture strength. The adhesive strength, averaged for 3 sets, was very high, of 41 MPa.

Experimental Example 30

Adhesion: Comparative Example

A 0.6 mm-thick hot-dip zinc-aluminum alloy coated steel sheet (commonly referred to as galvalume steel sheet) "GL-AZ150" was cut into 18 mm×45 mm rectangular pieces, to prepare zinc-aluminum alloy coated steel sheet pieces. The pieces were immersed for 5 minutes in the same degreasing bath as used in Experimental example 7, were thoroughly rinsed with water, and were dried at 90° C. for 15 minutes. The ends of these zinc-aluminum alloy coated steel sheet pieces, having only been degreased, were coated with an epoxy adhesive "EP 106", and were placed in a desiccator. The desiccator was depressurized to an inner pressure of 3 mmHg using a vacuum pump. The pressure was reverted to normal pressure after two minutes in a reduced-pressure state. The operation of reverting to normal pressure after depressurization was carried out a total three times, and then the zinc-aluminum alloy coated steel sheet pieces were removed from the desiccator. The removed zinc-aluminum alloy coated steel sheet pieces were stacked onto each other and were fixed, in the manner illustrated in FIG. 11, with clips. The adhesion area therebetween was 0.6 to 0.7 cm$^2$. These fixed assemblies were heated in a hot-air dryer. Specifically, the temperature was raised to 135° C. and was held there for 40 minutes. Thereafter, the temperature was further raised to 165° C. and was held there for 30 minutes. The bonded body obtained after cooling was left to stand for one week, after which the bonded body was tested to failure using a tensile tester, to measure the average shear rupture strength. The adhesive strength averaged over 3 sets was strong, of 28 MPa, but significantly inferior to that of Experimental example 29. This showed that bonding strength is enhanced when the epoxy adhesive penetrates into the irregularities and ultra-fine irregularities of the micron-scale roughness, and solidifies in that state within the irregularities.

Experimental Example 31

Preparation of CFRP Prepreg

A thermosetting resin according to Table 3 was prepared in order to produce the CFRP prepreg.

TABLE 3

Thermosetting resin for prepreg

| | | Proportion (parts by weight) |
|---|---|---|
| Resin fraction | | |
| Epoxy resin | Brominated bisphenol A solid epoxy resin "EPC-152 (by Dainippon Ink & Chemicals)" | 10.0 |
| | Bisphenol A liquid epoxy resin "EP-828 (by Yuka-Shell Epoxy)" | 13.9 |
| | Bisphenol F liquid epoxy resin "EPC-830 (by Dainippon Ink & Chemicals)" | 24.8 |
| Elastomer | Weakly crosslinked carboxyl-terminated solid acrylonitrile butadiene rubber "DN-611 (by Zeon Corporation)" | 8.0 |
| | Thermoplastic hydroxyl-terminated polyether sulfone "PES-100P (by Mitsui Toatsu Chemicals)" | 3.0 |
| Curing agent | | |
| Tetraglycidyldiaminodiphenylmethane "ELM-434 (by Sumitomo Chemical)" | | 15.0 |
| 4,4'-diaminodiphenyl sulfone "4,4'-DDS (by Sumitomo Chemical)" | | 25.0 |
| BF$_3$-monoethylamine complex "BF$_3$•MEA" | | 0.3 |
| Total | | 100.0 |

A thermosetting resin having the composition of Table 3 was blended at normal temperature and was rolled into a sheet shape. The obtained thermosetting resin film was set in a prepreg machine, and was pressure-bonded from both sides of unidirectionally aligned carbon fibers "T-300 (by Toray)", as reinforcing fibers, under application of pressure in accordance with known methods, to prepare a CFRP prepreg having a resin content adjusted to 38% and a fiber areal weight of 190 g/m$^2$.

Experimental Example 32

Production of a Composite

The ends of the surface-treated galvanized steel sheet pieces of Experimental example 6 were coated with the same epoxy adhesive "EP 106" of Experimental example 27. The pieces were placed in a desiccator and the operation of reverting to normal pressure after depressurization was carried out a total three times. Composites of CFRP pieces and the galvanized steel sheet pieces were prepared using the above-described baking jig 41 illustrated in FIG. 9. Carbon fibers "T-300" cut separately were overlaid on the end of a galvanized steel sheet piece 51, as in FIG. 9, having been subjected to depressurization/return to normal pressure over three times. An epoxy adhesive "EP-106", discharged out of a syringe, was coated onto the "T-300". A second ply of "T-300" was overlaid thereon, the same adhesive was applied, a further third ply of "T-300" was overlaid thereon, and the same adhesive was applied. The result was a stack of three plies of carbon fibers impregnated with epoxy adhesive (denoted by the reference numeral 52 in FIG. 9). The adhesive "EP-106" was used in an amount of about 1 cc.

The spacer 53 is wedged in the space between the inner wall face of the mold body 42 and the carbon fibers thus stacked. The demolding film 54 is laid so as to cover the spacer 53 and the stacked carbon fibers. A PTFE block 55 of PTFE (polytetrafluoroethylene resin) is placed, as a weight, on the demolding film 54. A weight 58 of 0.5 kg is further placed thereon. In this state, the entire baking jig was placed in a hot-air dryer. The dryer was powered, the temperature was raised to 100° C. and was left there for 1 hour. Next, the temperature was raised to 135° C., heating proceeded at that temperature for 40 minutes, and then the temperature was raised to 165° C. over 5 minutes. The temperature was held at 165° C. for 1 hour, was raised to 180° C., was held there for 20 minutes, and then the dryer was powered off and was left to cool with the door closed. On the next day, the baking jig 1 was removed from the dryer and the composite 50 of the galvanized steel sheet pieces and the CFRP piece was demolded. The same operation was repeated to obtain four sets of composites 50.

On the second day after bonding, the four composites were measured for shear rupture strength using a tensile tester. The CFRP portion was sandwiched between two pieces of sandpaper-roughened 1 mm-thick SUS304 stainless steel pieces. The resulting stack was clamped and fixed between chuck plates. The average shear rupture strength of four sets was very high, of 35 MPa.

Experimental Example 33

Production of a Composite

The ends of the surface-treated galvanized steel sheet pieces of Experimental example 6 were coated with the same epoxy adhesive "EP 106" of Experimental example 27. The pieces were placed in a desiccator and the operation of reverting to normal pressure after depressurization was carried out a total three times. Composites of CFRP pieces (cured CFRP prepreg prepared in Experimental example 31) and the galvanized steel sheet pieces were prepared using the above-described baking jig 41 illustrated in FIG. 9. Three plies of the CFRP prepreg prepared in Experimental example 31 were overlaid (reference numeral 52 in FIG. 9) on the ends of a galvanized steel sheet piece 51 having been subjected to three operations of depressurization/reverting to normal pressure in FIG. 9.

A spacer 53 is wedged in the space between the inner wall face of the mold body 42 and the CFRP prepreg thus stacked. The demolding film 54 is laid so as to cover the spacer 53 and the stacked CFRP prepreg. A PTFE block 55 of PTFE (polytetrafluoroethylene resin) is placed, as a weight, on the demolding film 54. A weight 58 of 0.5 kg is further placed thereon. In this state, the entire baking jig was placed in a hot-air dryer. The dryer was powered, the temperature was raised to 100° C. and was left there for 1 hour. Next the temperature was raised to 135° C., heating proceeded at that temperature for 1 hour, and then the temperature was raised to 165° C. and left there for 1 hour. The temperature was raised to 180° C., was held there for 20 minutes, and then the dryer was powered off and was left to cool with the door closed. On the next day, the baking jig 1 was removed from the dryer and the composite 50 of the galvanized steel sheet pieces and the CFRP piece (cured product of three plies of CFRP prepreg) was demolded. The same operation was repeated to obtain four sets of composites 50.

On the second day after bonding, the four composites were measured for shear rupture strength using a tensile tester. The CFRP portion was sandwiched between two pieces of sandpaper-roughened 1 mm-thick SUS304 stainless steel pieces. The resulting stack was clamped and fixed between chuck plates. The average shear rupture strength for four sets was very high, of 33 MPa.

Experimental Example 34

Adhesion

An adhesive was obtained by thoroughly mixing 10 g of commercially available vinyl ester unsaturated polyester "Ripoxy R802 (by Showa High Polymer)" for GFRP and 0.1 g of t-butyl peroxybenzoate "Perbutyl Z (by Nippon Oil and Fats)". The ends of the surface-treated galvanized steel sheet pieces of Experimental example 6 were coated with the obtained adhesive, and were placed in a desiccator. The desiccator was depressurized to an inner pressure not higher than 50 mmHg using a vacuum pump. This reduced-pressure state was held for several seconds, and then the pressure was reverted to normal pressure. The operation of reverting to normal pressure after depressurization was carried out a total three times, and then the galvanized steel sheet pieces were removed from the desiccator. The removed galvanized steel sheet pieces were stacked onto each other and were fixed, in the manner illustrated in FIG. 11, with clips, to prepare three sets. The adhesion area therebetween was 0.6 to 0.7 cm². These fixed assemblies were heated in a hot-air dryer. Specifically, the temperature was raised to 90° C. and was held there for 1 hour. Thereafter, the temperature was further raised to 120° C. and was held there for 1 hour. The bonded body obtained after cooling was left to stand for one week, after which the bonded body was tested to failure using a tensile tester, to measure the average shear rupture strength. The strength was very high, of 27 MPa.

INDUSTRIAL APPLICABILITY

The present invention provides a technology for strongly bonding galvanized steel sheets, which are used as ordinary construction materials having good corrosion-resistance and post-workability, with resin molded articles, FRP and metal alloys. The composite of an adherend and a galvanized steel sheet according to the present invention, and the method for manufacturing the composite, are useful in particular in the field of construction materials.

The invention claimed is:
1. A method for manufacturing a bonded body of a galvanized steel sheet and an adherend, consisting of:

a surface treatment step of performing a liquid treatment for creating, on the surface of a galvanized steel sheet, micron-scale roughness having a peak-valley average spacing (RSm) of 0.8 to 10 μm and a maximum height roughness (Rz) of 0.2 to 5 μm, forming ultra-fine irregularities having a period of 10 to 300 nm within the surface having the micron-scale roughness, and making the surface layer into a layer of a metal oxide or a metal phosphate, wherein the liquid treatment performed in said surface treatment step includes only a degreasing treatment of immersing the galvanized steel sheet in a degreasing solution for aluminum;

an inserting step of inserting the galvanized steel sheet, having undergone said surface treatment step, into an injection molding mold; and an integrating step of injecting a thermoplastic resin composition having, as a main component, one or more selected from among polybutylene terephthalate, polyphenylene sulfide and an aromatic polyamide, onto the surface of said inserted galvanized steel sheet, and curing the injected thermoplastic resin composition after having penetrated into said ultra-fine irregularities, to thereby strongly integrate said galvanized steel sheet and a molded article of the thermoplastic resin composition.

2. The method for manufacturing a bonded body of a galvanized steel sheet and an adherend according to claim 1, wherein said galvanized steel sheet is a chromated-treated galvanized steel sheet.

3. The method for manufacturing a bonded body of a galvanized steel sheet and an adherend according to claim 2, wherein said chromated-treated galvanized steel sheet is Z18 according to JIS G3302, and said degreasing treatment involves immersing the Z18 in a degreasing solution for aluminum at 70° C. or higher for 5 to 10 minutes.

4. A method for manufacturing a bonded body of a galvanized steel sheet and an adherend, consisting of:

a surface treatment step of performing a liquid treatment for creating, on the surface of a galvanized steel sheet, micron-scale roughness having a peak-valley average spacing (RSm) of 0.8 to 10 μm and a maximum height roughness (Rz) of 0.2 to 5 μm, forming ultra-fine irregularities having a period of 10 to 300 nm within the surface having the micron-scale roughness, and making the surface layer into a layer of a metal oxide or a metal phosphate, wherein the liquid treatment performed in said surface treatment step is:

to perform a degreasing treatment of immersing the galvanized steel sheet in a degreasing solution for aluminum; and then, to perform a conversion treatment selected from the group consisting of: (1) a chromate treatment; (2) a zinc phosphate treatment; and (3) a zinc calcium phosphate treatment;

an inserting step of inserting the galvanized steel sheet, having undergone said surface treatment step, into an injection molding mold; and an integrating step of injecting a thermoplastic resin composition having, as a main component, one or more selected from among polybutylene terephthalate, polyphenylene sulfide and an aromatic polyamide, onto the surface of said inserted galvanized steel sheet, and curing the injected thermoplastic resin composition after having penetrated into said ultra-fine irregularities, to thereby strongly integrate said galvanized steel sheet and a molded article of the thermoplastic resin composition.

5. The method according to claim 4, wherein the chromate treatment is to immerse the sheet in an aqueous solution comprising trivalent chromium, hexavalent chromium, phosphoric acid and nickel; the zinc phosphate treatment is to immerse the sheet in an aqueous solution comprising phosphoric acid, divalent zinc, nickel and a fluorosilicate; and the zinc calcium phosphate treatment is to immerse the sheet in an aqueous solution comprising phosphoric acid, divalent zinc, calcium and nickel.

6. A method for manufacturing a bonded body of a zinc-aluminum alloy coated steel sheet and an adherend, consisting of:

a surface treatment step of performing a liquid treatment for creating, on the surface of a zinc-aluminum alloy coated steel sheet, micron-scale roughness having a peak-valley average spacing (RSm) of 0.8 to 10 μm and a maximum height roughness (Rz) of 0.2 to 5 μm, forming ultra-fine irregularities having a period of 10 to 300 nm within the surface having the micron-scale roughness, and making the surface layer into a layer of a metal oxide or a metal phosphate, wherein the liquid treatment performed in said surface treatment step is:

to perform a degreasing treatment of immersing the zinc-aluminum alloy coated steel sheet in a degreasing solution for aluminum; and then to perform chemical etching of immersing the sheet in an acidic aqueous solution of pH 1 to 3, and then, to perform one conversion treatment selected from the group consisting of: (1) a chromate treatment, (2) a zinc phosphate treatment, and (3) a zinc calcium phosphate treatment, an inserting step of inserting the zinc-aluminum alloy coated steel sheet, having undergone said surface treatment step, into an injection molding mold; and an integrating step of injecting a thermoplastic resin composition having, as a main component, one or more selected from among polybutylene terephthalate, polyphenylene sulfide and an aromatic polyamide, onto the surface of said inserted zinc-aluminum alloy coated steel sheet steel sheet, and curing the injected thermoplastic resin composition after having penetrated into said ultra-fine irregularities, to thereby strongly integrate said zinc-aluminum alloy coated steel sheet and a molded article of the thermoplastic resin composition.

7. The method according to claim 6, wherein the chromate treatment is to immerse the sheet in an aqueous solution comprising trivalent chromium, hexavalent chromium, phosphoric acid and nickel, the zinc phosphate treatment is to immerse the sheet in an aqueous solution comprising phosphoric acid, divalent zinc, nickel and a fluorosilicate, and the zinc calcium phosphate treatment is to immerse the sheet in an aqueous solution comprising phosphoric acid, divalent zinc, calcium and nickel.

* * * * *